US011671192B2

(12) United States Patent
Cole et al.

(10) Patent No.: US 11,671,192 B2
(45) Date of Patent: Jun. 6, 2023

(54) METHOD OF CONSTRUCTING AND HANDLING REQUESTS FOR DATA FILES

(71) Applicant: UBC Media Group PLC, London (GB)

(72) Inventors: Simon Andrew Cole, London (GB); Iain Duncumb, Loughborough (GB)

(73) Assignee: UBC Media Group PLC, London (GB)

( * ) Notice: Subject to any disclaimer, the term of this patent is extended or adjusted under 35 U.S.C. 154(b) by 767 days.

(21) Appl. No.: 15/646,652

(22) Filed: Jul. 11, 2017

(65) Prior Publication Data
US 2017/0310408 A1    Oct. 26, 2017

Related U.S. Application Data

(62) Division of application No. 12/519,257, filed as application No. PCT/GB2007/001917 on May 24, 2007, now abandoned.

(30) Foreign Application Priority Data

Dec. 18, 2006 (GB) ...................................... 0625178
Mar. 7, 2007 (GB) ...................................... 0704422

(51) Int. Cl.
*H04H 60/06* (2008.01)
*G06Q 30/06* (2023.01)
(Continued)

(52) U.S. Cl.
CPC ......... *H04H 60/06* (2013.01); *G06Q 30/0601* (2013.01); *H04H 60/27* (2013.01);
(Continued)

(58) Field of Classification Search
CPC ...... G06Q 20/00–425; G06F 21/00–88; H04N 21/00–8586; H04H 60/06
See application file for complete search history.

(56) References Cited

U.S. PATENT DOCUMENTS 6,957,041 B2 * 10/2005 Christensen ....... G06Q 30/0605
455/3.06
7,415,430 B2    8/2008 Christensen et al.
(Continued)

FOREIGN PATENT DOCUMENTS

WO    WO 97/28620    8/1997
WO    WO 02/13073    2/2002
(Continued)

OTHER PUBLICATIONS

International Search Report for corresponding PCT Application No. PCT/GB2007/001917 dated Mar. 31, 2008.

*Primary Examiner* — Mohammad A. Nilforoush
(74) *Attorney, Agent, or Firm* — Caesar Rivise, PC

(57) ABSTRACT

A method of constructing and handling a request for a desired data file relating to a broadcast segment of a broadcast signal is described. The method comprises receiving an information signal at a receiving device. The information signal comprises at least a data element, and the data element relates to a segment of the broadcast signal. The method also comprises presenting the data element to a user interface of the receiving device, obtaining a user selection of the data element from the user interface, and constructing and transmitting a request for the desired data file relating to the selected data element, the request including an identifier relating to the desired data file.

8 Claims, 18 Drawing Sheets

(51) Int. Cl.
    *H04H 60/27* (2008.01)
    *H04H 20/28* (2008.01)
    *H04H 60/23* (2008.01)
    *H04H 60/91* (2008.01)
    *G06Q 30/0601* (2023.01)

(52) U.S. Cl.
    CPC ............ *H04H 20/28* (2013.01); *H04H 60/23* (2013.01); *H04H 60/91* (2013.01)

(56) References Cited

U.S. PATENT DOCUMENTS

| | | |
|---|---|---|
| 7,509,667 B1 | 3/2009 | Cook |
| 7,773,939 B2 | 8/2010 | Christensen et al. |
| 7,917,130 B1 | 3/2011 | Christensen et al. |
| 9,113,232 B2 * | 8/2015 | Poltorak ............ G11B 27/105 |
| 2002/0086464 A1 | 6/2002 | Tomsen et al. |
| 2002/0116632 A1 | 8/2002 | Itoh et al. |
| 2002/0132575 A1 | 9/2002 | Kesling et al. |
| 2003/0142101 A1 | 7/2003 | Lavelle et al. |
| 2004/0128366 A1 * | 7/2004 | Morillon ............ H04N 21/8166 348/E7.063 |
| 2004/0249768 A1 | 12/2004 | Kontio et al. |
| 2004/0254913 A1 | 12/2004 | Bernstein et al. |
| 2005/0154599 A1 | 7/2005 | Kopra et al. |
| 2006/0015637 A1 | 1/2006 | Chung |
| 2006/0095339 A1 | 5/2006 | Hayashi et al. |
| 2006/0100924 A1 | 5/2006 | Tevanian, Jr. |
| 2006/0141962 A1 | 6/2006 | Forbes et al. |
| 2006/0177028 A1 | 8/2006 | Vermola |
| 2006/0218613 A1 | 9/2006 | Bushnell |
| 2006/0235864 A1 | 10/2006 | Hotelling et al. |
| 2006/0279628 A1 * | 12/2006 | Fleming ............... G11B 27/034 348/143 |
| 2008/0253565 A1 * | 10/2008 | Fontijn .................. H04H 60/23 380/255 |

FOREIGN PATENT DOCUMENTS

| | | | |
|---|---|---|---|
| WO | WO 02/097585 | 12/2002 | |
| WO | WO 03/090484 | 10/2003 | |
| WO | WO-2005041505 A1 * | 5/2005 | ............ H04H 20/28 |
| WO | WO2005/076574 | 8/2005 | |
| WO | WO2006/102448 | 9/2006 | |
| WO | WO2008/080006 | 7/2008 | |
| WO | WO2008/080022 | 7/2008 | |

* cited by examiner

Playlist Information

90

```
Radio Station Identifier – Heart FM 100.7 fm ──── 136

Event #1          ──140
Duration: 180s
Scheduled start time: 9:05:00am ──── 138
RUID#0023
Song title: "Grace Kelly"
Artist: 'MIKA'

Event #2          ──140
Duration: 195s
Scheduled start time: 9:08:00am ──── 138
RUID#0047
Song title: "Dancing Queen"
Artist: 'ABBA'

Event #3          ──140
Duration: 170s
Scheduled start time: 9:11:15am ──── 138
RUID#0019
Song title: "Same Jeans"
Artist: 'THE VIEW'

Event n
Duration: .....
Scheduled start time: .....
RUID#.....
Song title: "................."
Artist: '............'

METHOD OF CONSTRUCTING AND HANDLING REQUESTS FOR DATA FILES

CROSS-REFERENCE TO RELATED APPLICATIONS

This divisional patent application claims the benefit under 35 U.S.C. § 121 of application Ser. No. 12/519,257 filed on Nov. 11, 2009 which in turn claims the benefit under 35 U.S.C. § 371 of international patent application PCT/GB2007/001917 filed May 24, 2007 which in turn claims its priority from both UK application no. 0625178.9 filed on Dec. 18, 2006 and UK application no. 0704422.5 filed on Mar. 7, 2007 and all of which are entitled METHOD OF CONSTRUCTING AND HANDLING REQUESTS FOR DATA FILES and all of whose entire disclosures are incorporated by reference herein.

TECHNICAL FIELD

The present invention concerns a method of constructing and handling a request for a data file, and more particularly through not exclusively to improvements relating to downloading data associated with the content of a broadcast signal. The present invention is disclosed in the context of downloading music files related to a broadcast signal but the present invention is not limited to this field and could be applied to the accessing of any type of digital data files related to a broadcast signal.

BACKGROUND OF THE INVENTION

The number of mobile music downloads is growing more than any other digital music delivery medium. Typically, music is downloaded to a personal computer (PC) from an Internet Web site, such as iTunes® and thereafter from the PC to a personal music player, such as an MP3 player. This is a labour-intensive task and relies upon the user being technologically competent. Furthermore, the user must own a PC, be subscribed to the Internet, and be able to pay electronically.

It has been appreciated by the present inventors that radio is the primary driver for conventional music purchases, including downloading music as well as conventional CD purchasing.

One of the difficulties a user faces when they hear a broadcast song (music track) they wish to purchase on the radio, is that they miss the broadcast of the radio DJ providing the song title and artist/band name. This is frustrating for a user as they have to keep listening to the radio in order to identify the song of interest. Should the user then wish to purchase the song they can either visit a shop to purchase the CD, or they can purchase the song via the Internet, by downloading it from a download music track Web site at a time when they have access to a PC.

Music tracks downloaded in this way may then need to be transferred to another device before they can be listened to and enjoyed. This is cumbersome for the user, who experiences a delay before they can travel freely with the music tracks they desire.

Services exist which allow a user to identify the title and artist/band name of a song. The user, upon hearing a song of interest records at least a portion of the same, telephones the service provider and plays back the recorded portion of the song over the telephone line. At the service provider, a music recognition tool processes the received audio signal of the recorded portion and is able to identify the song by comparing it with its stored music tracks. Audio details regarding the song, such as song title and artist/band name, are subsequently presented to the user aurally. Should the user then wish to purchase the song, they can either visit a shop selling the single or Album CD, or can purchase the song via the Internet the next time they have access to a PC.

A further service which will soon be available will facilitate the downloading of music tracks using a "tag to download" method. Users must own a mobile phone which is enabled to use this service and one way of being enabled to use this service is to have a mobile phone with a suitable operating system, such as Symbian®. Using this service, each enabled mobile phone can connect to a service provider which facilitates listening to the radio. When a song of interest is played, the user may select to "tag" the currently playing music track. The user is then required to purchase the music track electronically. The tag is transmitted to the service and upon successful payment, the service provider then directly transmits, over the mobile telecommunications network, an encrypted data file relating to the "tagged" music track to the users' mobile phone. In addition, a license for the track is also transmitted to the mobile phone. The tracks are stored on the mobile phones and can be played back at the users' leisure. Users do not need to know the name of the artist or song to access tracks because the service utilizes a music recognition tool to create the tag.

FIG. 1 shows a flowchart 1 of the steps a user using this proposed service will take when downloading music tracks. A user listens, at step 2, to a radio broadcast. Upon hearing a song or interest, and wishing to purchase the currently playing music track, the user can "tag", at step 4, the song of interest using their mobile phone. The mobile phone sends, at step 6, a request to initiate purchasing the music track. Data regarding the request is then sent via the service provider's server to a mobile music shop server with which the user is registered. The tune playing is then matched, at step 8, to the shop's database, and a "buy now" option appears, at step 10, on the mobile phone. The user can then complete, at step 12, the purchase transaction, and only then is the music track downloaded to the mobile phone. The proposed service is likely to be integrated directly into mobile phones via a Symbian® software application.

However, as can be seen, this proposed service is time consuming and complex. There may well be difficulties with the subsequent transmittal of the purchased track in a mobile environment where signal strength can vary and there can be loss of reception if connection is required for a long period of time.

Also, with the advent of 3G-enabled mobile phones having an in-built music player, users can browse the Internet using the mobile phone to find a webpage concerning music, navigate through a number of pages in order to find a song of interest, which can be selected, purchased and downloaded to the mobile phone to be stored in memory and played when desired. There are problems with this method in that the user might not know the song name or artist/band name. Also it takes a long time, and the user has to go through many steps to find a specific music file. Furthermore, it takes time to download a music file over the mobile network, and in a mobile environment this is particularly susceptible to loss of reception and so files may not download completely. This does not provide an effective way of listening to new music: the user is required to know what they are looking for.

In addition, it is also possible to download music files to a PC and transfer the downloaded file to a mobile phone. Again, this requires the user to own a PC and be subscribed to the Internet. Furthermore, this system of obtaining new music files is not a truly mobile solution and the purchase procedure takes so long that from a user's perspective there is no "instant gratification".

An object of present invention is to overcome or reduce at least some of these problems.

SUMMARY OF THE INVENTION

One broad aspect of the present invention resides in the appreciation that by providing information to a user, listening to a radio broadcast, about what is currently being broadcast, it is possible to provide a method by which the user can gain access to a data file associated with what is currently being broadcast.

Listening to the radio has long been considered as the most efficient prompt for a user when purchasing music. Advantageously a user can purchase a music track, for example, as they listen without the need to remember the song and artist name or search through a music library to find the song of choice. In addition, listening to the radio is non-intrusive and the above aspect of the present invention enables a user to purchase music as and when they listen to a track they wish to own without it substantially interrupting their active task. In this way, this aspect of the present invention can be considered to sit alongside something the user is already very familiar with—listening to radio for example.

The method requires three elements to work with the above aspect of the present invention, namely a broadcast receiver, such as a DAB receiver FM/AM radio receiver, digital television or a PC with an Internet connection; a mass storage unit such as a secure digital (SD) memory card; and a communications back-channel provided for example by a GSM or GPRS transmitter (of a mobile phone). However these elements need not all be in the same device. Furthermore, the user must be able, using one of the three components, to be presented with information (view a display of information) concerning the broadcast and select a (displayed) option regarding obtaining/purchasing a data file (music track) relating to the broadcast.

In different embodiments, it is possible to implement the receiver as a dedicated DAB chip within a mobile phone for supplying the present music download embodiment, or as an application operating on a mobile phone which has a non-dedicated DAB receiver chip for receiving digital television broadcasts, for example. It is also possible in other embodiments for the receiver to be a dedicated digital radio device having access to a communications channel such as a WiFi channel or a fixed telecommunications channel. The facilities for utilising the communications channel can be integrated into the receiver or be connectable to the receiver (for example by a wired or wireless (e.g. Bluetooth) connection to a mobile or fixed line telephone).

Another important aspect of the present invention resides in the inventors' appreciation that a receiving device, such as a digital radio, receiving an information signal, can be used to trigger and facilitate the purchase of music tracks through a Wireless Local Area Network (WLAN). Furthermore, given the transient nature of connection between digital radio receivers particularly, mobile receivers, to the Internet, this aspect of the present invention provides a mechanism whereby it is possible to select to purchase a digital music track or a digital video file as soon as it is played, regardless of whether the receiving device is within range of a WLAN at that time. Preferably the receiving device also receives the broadcast signal.

Another broad aspect of the present invention resides in the appreciation that an encrypted downloadable data file can be transmitted with a broadcast signal, the data file relating to the current content of the broadcast signal and the sending of the data file having been triggered by confirmation that the current content is actually being broadcast. In this way, when a file is selected, all that needs to be done is to obtain the decryption key otherwise known as a license for the data file which has already been downloaded and stored on the receiver. This makes the downloading process quicker and easier to use than some prior art techniques. In a digital radio station this is possible because the radio station will have a playlist (broadcast schedule) of songs to be played which can be used to retrieve and provide the appropriate files to a DAB multiplex. Also the fact that the content of the broadcast signal is confirmed as actually being transmitted ensures that the transmitted data file is selected quickly and is always correctly related to the content. In situations where broadcast content deviates from a playlist, the present invention provides a fast, efficient and reliable way of ensuring correct matching of the data file with the actual broadcast content.

Furthermore, according to another broad aspect of the present invention there is provided a digital information device arranged to receive an information signal relating to a broadcast signal from a digital information broadcasting source, the digital information device being arranged to be used to select an element of the information signal relating to a broadcast segment and to trigger and facilitate the purchase of a data file corresponding to the selected segment through a communications channel such as a Wireless Local Area Network (WLAN).

Another important aspect of the present invention resides in the simultaneous broadcast of an audio or video data segment within a digital broadcast channel for real-time playback on a receiving device, and an audio or video data file corresponding to the audio or video segment, the corresponding data file being completely delivered within start and end points of the corresponding audio or video segment to maintain synchronicity of the segments and the corresponding files.

More specifically, according to one aspect of the present invention there is provided a method of constructing and handling a request for a desired data file relating to a broadcast segment of a broadcast signal, the method comprising receiving an information signal at a receiving device, the information signal comprising at least a data element, the data element relating to a segment of the broadcast signal; presenting the data element to a user interface of the receiving device; obtaining a user selection of the data element from the user interface; and constructing and transmitting a request for the desired data file relating to the selected data element, the request including a unique identifier relating to the desired data file.

This aspect of the present invention greatly simplifies the selection process of a data file relating to a broadcast signal and enables the user experience to be fast and uncomplicated in selecting the desired data file. This is a particularly important aspect in order for the invention to have mass appeal with users.

Optionally, the data element, within the information signal, may relate to a current broadcast segment of the broadcast signal. At the very least the method can enable selection of a data file relating to the currently broadcast segment of a broadcast signal, such that for example the user can select to purchase the music track currently being played on the radio.

Preferably, the receiving step comprises receiving an information signal comprising an ordered list of data elements, each data element relating to a broadcast segment of the broadcast signal; the presenting step comprises presenting the ordered list of data elements to the user interface of the receiving device; and the obtaining step comprises obtaining a user selection of one of the data elements from the user interface. In this case, the user is presented with options to obtain a data file relating to a previous, current and possibly future segment of the broadcast signal, for purchase for example. Accordingly, the user may be presented with a list of data elements relating to what is being broadcast, what has recently been broadcast and/or what is most likely to be broadcast in the near future.

The method preferably comprises receiving the broadcast signal at the receiving device, and outputting the current broadcast segment of the broadcast signal to the user via output means. Advantageously, this enables a user to select data elements on the device they are using to listen to the broadcast, meaning that the method of requesting desired data files is highly portable.

In one preferred embodiment, the broadcast signal receiving step comprises receiving the information signal within the received broadcast signal. A broadcast information signal is another optimum way of receiving all of the service in a single package making the receiving device more portable.

The method may comprise receiving the broadcast signal on a presentation device other than the receiving device, and outputting the current broadcast segment of the broadcast signal to the user via the presentation device. Advantageously, this means that a user can use any device for example to tune into a radio station they enjoy, and be able to use a receiving device, which can use the method of the present invention, to carry out their request for desired data files relating to segments of the broadcast signal.

Optionally, the broadcast signal receiving step comprises receiving a broadcast signal comprising an audio or video broadcast segment. The present invention is applicable to any type of data file but most preferably to an audio file or a video file which relates to the selected broadcast segment.

In a preferred embodiment, the broadcast signal receiving step comprises receiving a Digital Audio Broadcast (DAB) signal.

Alternatively, the information signal receiving step may comprise receiving the information signal in response to a request from the receiving device. This enables the receiving device to operate an "on-demand" pull service which can save power and make a portable receiving device more adaptable in different environments.

Optionally, the information signal receiving step comprises receiving the information signal via a wireless local area communications network. More preferably, the information signal receiving step comprises receiving the information signal via a WiFi communications network. Such local area networks and in particular WiFi networks can be more reliable than other wireless communications channels, which help to improve the reliability of the method.

In another preferred embodiment, the information signal receiving step comprises receiving the information signal via an Internet connection to the device.

In a further preferred embodiment the information signal receiving step comprises receiving the information signal via a mobile telecommunications network, such as a GPRS, or 3G telecommunications network.

Preferably, the information signal receiving step further comprises receiving metadata relating to the segment of the broadcast signal. This is a very useful feature in that it enables enhancement of the presentation of the data element to the user interface, to better facilitate informed user selection of a data element. Such metadata may include image files relating to the data element for example.

More preferably, the presenting step comprises presenting the data element together with its associated metadata to the user interface.

Yet more preferably, the presenting step comprises presenting the list of data elements together with the associated metadata of each data element to the user interface.

In a preferred embodiment, the presenting step comprises presenting a plurality of user-selectable options regarding making the desired data file available to the user, the obtaining step comprises obtaining the user selection and the constructing step comprises specifying the user-selected option in the request. In this way the user can select how they wish to access the desired file, is it to be accessible to the receiving device, or to their main computer via the internet for example, or even to specified remote device.

Typically, the method comprises receiving the data file relating to the broadcast segment in an encrypted format. The integrity of the data file can be maintained and only authorised users can have access to the data file.

Preferably, the encrypted file receiving step comprises receiving the encrypted data file relating to the broadcast segment prior to the user selection of the desired data file. This is only possible because the data file is encrypted. However, the benefit is that the file has already been received and the request is simply requesting the means to make the received file accessible (decryption).

In a preferred embodiment, the method comprises storing the received encrypted data file in a first cache memory of the receiving device.

The method may further comprise determining the availability of a desired data file on the basis of whether the stored encrypted data file corresponds to the selected broadcast segment.

Preferably, the method comprises transferring the available encrypted data file to a second cache memory upon user selection. In this way the first data cache can simply be a continually updating buffer of selectable encrypted data files whereas the second data cache can relate to the selected data files. The provision of the second data cache prevents overwriting of the desired data file whilst authorisation for access to the data file is being sought.

Typically, in response to transmitting the request, the method comprises receiving a decryption key for the desired encrypted data file, and storing the decryption key on the receiving device. This enables the data file to always be stored in an encrypted format and only decrypted for playback access. This is a very secure way of distributing data files which makes unauthorised copying more difficult.

In a preferred embodiment, the transferring step further comprises transferring the selected data file from the second cache to a memory storage location of the receiving device in response to receiving the decryption key.

Furthermore, the step of receiving a decryption key may comprise receiving an encrypted decryption key for providing an even more secure distribution method.

Typically, the decryption key receiving step comprises receiving a decryption key that has been encrypted using an identifier of the receiving device.

Preferably, the method further comprises decrypting the decryption key, and using the decryption key to unlock the encrypted data file each time user access is required to the desired data file.

Typically, the constructing step comprises constructing a primary request for a decryption key for the available encrypted data file when the transferring step has transferred the available encrypted data file to the second cache memory.

Preferably, the encrypted file receiving step comprises receiving the encrypted data file relating to the broadcast segment in response to the request transmitting step.

In one preferred embodiment, the encrypted file receiving step comprises receiving the encrypted file via a wireless local area communications network. More preferably the encrypted file receiving step comprises receiving the encrypted file via a WiFi communications network. This is preferred as it can be a more reliable communications channel than other channels.

In a preferred embodiment, the information signal receiving step comprises receiving the information signal via an Internet connection to the device.

In yet another preferred embodiment, the encrypted file receiving step comprises receiving the encrypted file via a mobile telecommunications network, such as a GPRS or a 3G network.

Typically, the method comprises, in response to transmitting the request, receiving a decryption key for the desired encrypted data file, and storing the decryption key on the receiving device.

Optionally, the constructing step comprises constructing the request including an identifier of the device initiating the request.

Preferably, the constructing step comprises constructing a request that the selected data file is transmitted to the receiving device.

More preferably, the constructing step comprises constructing a request that the selected data file is made available to the user for download to a user computer. In this way the user can have access to the data file for use in a multitude of different ways, for example to transfer to different user devices (MP3 player, burn onto CD, etc.).

Typically, the transmitting step comprises transmitting the constructed request to an authorisation server.

In a preferred embodiment, the transmitting step comprises a first transmitting step of transmitting an authorisation request to an authorisation server and a second step of transmitting, in response to receiving an authorisation response, the constructed request for the desired file.

Typically, the second transmitting step comprises transmitting a received authorisation code in the constructed request. This minimises the work that the data file library would need to do to confirm that the request was authorised.

In a preferred embodiment, the method further comprises delaying the transmitting step until a communications channel suitable for conveying the request is available to the device. This is particularly useful in for wireless communications channels and portable devices where network coverage may vary and requests are stored until a communications channel is established to support transmission of the request.

Optionally, the method may further comprise storing the constructed request on the receiving device, connecting the receiving device to an auxiliary request transmitting device at which a suitable communications channel is available, and transmitting the constructed request via the auxiliary request transmitting device. Being able to use alternative communications channels is highly advantageous.

Preferably, the method comprises receiving a confirmation message confirming the acceptance of the request and access to the requested data file.

According to another aspect of the present invention there is provided a method of requesting and obtaining a desired data file relating to a broadcast segment of a broadcast signal, the method comprising a method of constructing and handling a request for a desired data file relating to a broadcast segment of a broadcast signal as described above; receiving the request at a data file library; determining whether the request is authorised; and providing access to the desired data file if the request is authorised.

Optionally, the method may comprise authorising the request prior to providing access to the desired data file.

Typically, the authorising step comprises using the identifier for the receiving device provided within the request to determine whether the receiving device is authorised to have access to the desired data file.

Preferably, the authorising step comprises determining the identity of the receiving device from the characteristics of the received request and verifying the received identifier against the determined identity of the receiving device.

In a preferred embodiment, the method further comprises determining whether the receiving device has previously been provided access to the desired data file.

Typically, the method comprises carrying out a payment transaction if the receiving device is authorised.

Preferably, the method further comprises carrying out a payment transaction if the receiving device is authorised and if the determining step has determined that the receiving device has not previously purchased the desired data file.

In a preferred embodiment, the method further comprises encrypting the decryption key using the received identifier for the receiving device.

The identifier may comprise a unique identifier and more preferably the unique identifier may comprise a network identity of the receiving device and information relating to an installed application on the device. This information is particularly useful in a mobile environment and facilitates secure authentication of the user.

Typically, the providing step comprises providing the desired data file in an encrypted format to a storage device which is separate to the receiving device.

In a preferred embodiment, the providing step comprises transmitting the encrypted data file over a Wireless Local Area Network communications channel.

In another preferred embodiment, the providing step comprises transmitting the encrypted data file over a mobile telecommunications network.

In yet another preferred embodiment, the providing step comprises facilitating the encrypted data file to be downloaded to a user's computer connectable to the Internet.

The present invention also extends to a computer program comprising program instructions for causing a device to perform elements of the method as described above. Such a program may advantageously be downloaded to a receiving device and installed thereon to give the receiving device the capability to implement the present invention.

According to another aspect of the present invention there is provided a device for constructing and handling a request for a desired data file relating to a broadcast segment of a broadcast signal, the device comprising receiving means for receiving an information signal at a receiving device, the information signal comprising at least a data element, the data element relating to a segment of the broadcast signal; presenting means for presenting the data element to a user interface of the receiving device; obtaining means for obtaining a user selection of the data element from the user interface; and constructing and transmitting means for constructing and transmitting a request for the desired data file relating to the selected data element, the request including an identifier relating to the desired data file.

Optionally, the device comprises one of the group comprising: a mobile telecommunications device, an Internet-enabled computer, a digital broadcast receiving device, and a digital satellite receiving device.

More specifically, according to a further aspect of the present invention, there is provided a digital broadcast system comprising receiving means for receiving a trigger signal signifying that broadcast of a current segment of media information has commenced via a digital broadcasting channel, the trigger signal comprising a media information identifier identifying the current segment of media information; selecting means for selecting a data file relating to the current segment identified by the media information identifier; and output means for outputting the related data file to the digital broadcasting channel for broadcast with the current segment of the media information; wherein the output means is arranged to control the timing of the output of the related data file, such that the data file is output as a consequence of receipt of the trigger signal.

Preferably the transmission of the data file is synchronised with the content of the broadcast data, such that the encrypted/locked file is preferably transmitted within the start/end points of a broadcast signal segment relating to a particular content. This synchronisation between the natural speed of transmission of the broadcast data and the encrypted file enables data to be provided in real-time and means the receiver does not need to carry out complicated processing such as resynchronisation of received data files.

The above aspect of the present invention improves delivery of data-files, such as music files or video files, to mobile receivers such as mobile telecommunication devices, for example mobile phones. Delivery of the music file is by broadcasting and storing on the mobile telecommunications device substantially concurrently with the music track as it is broadcast via a digital radio channel. A user wishing to purchase a particular music track can, provided that the music file has been received completely, request and receive a decryption key/licence for the chosen track via a communications channel. Advantageously, the file does not need to be downloaded at or after the point of purchase because it has already been downloaded and stored as the music track was playing on the radio. Therefore, the present invention is much faster and less liable to fail in providing the desired file to the user, particularly when the receiver is a mobile receiver being subject to varying signal strengths as it is used. In this way, this aspect of the present invention promotes instant gratification when purchasing music tracks or video clips for example.

The receiver again requires three elements to work with the above aspect of the present invention, a mass storage unit such as a secure digital (SD) memory card and a communications back channel provided for example by a GSM or GPRS transmitter (of a mobile phone) as described above and also a digital radio receiver such as a DAB receiver.

Typically, the receiving means is arranged to receive the trigger signal from a broadcast source.

Optionally, the receiving means is arranged to receive an advance warning notification regarding a plurality of new segments of media information to be broadcast by a broadcast source.

Preferably, the receiving means is arranged to receive a schedule (playlist) regarding a plurality of upcoming segments of media information which are likely to be broadcast by a broadcast source in the near future.

In a preferred embodiment, the output means is arranged to output an additional information signal for broadcast with the related data file, the additional information signal comprising information relating to one or more of: the current segment of media information currently being broadcast; a plurality of previously broadcast segments of media; and a plurality of segments of media information to be broadcast.

Typically, the trigger signal comprises an HTTP post signal. In addition, the output means preferably may be arranged to output an encrypted data file.

In one preferred embodiment, the trigger means and the output means are arranged to output the data file relating to the current segment of media information substantially non-simultaneously with the broadcast of the current segment of the media information.

In another preferred embodiment, the trigger means and the output means are arranged to output the data file relating to the current segment of media information substantially simultaneously with the broadcast of the current segment of the media information.

The digital broadcast system typically comprises a digital broadcast multiplexer for broadcasting, via the digital broadcasting channel, the media information and the data file.

Preferably, the digital broadcast multiplexer is arranged to broadcast, via the digital broadcasting channel, the additional information signal.

The digital broadcast typically also comprises a digital radio broadcast system.

According to another aspect of the present invention there is provided a combination of the digital broadcast system and a receiving device arranged to receive the broadcast digital media information segment and the related broadcast data file, the receiving device being further arranged to store the related data file.

The receiving device may comprise a mobile telecommunications device having a digital broadcast receiver and a telecommunications transmitter/receiver for facilitating digital communications.

The digital broadcast system may comprise a radio broadcast system and the receiving device may comprise a digital radio receiver device.

Typically, the receiving device is arranged to store a predetermined maximum number of related data files in chronological broadcast order and the receiving device is further arranged to overwrite an oldest data file with a new data file when the predetermined maximum number of received related data files have been stored.

Preferably, the receiving device is arranged to receive and use the additional related information signal, to display on a screen of the receiving device, identifying information identifying a plurality of the recently received broadcast digital media information segments.

More preferably, the receiver comprises determining means arranged, on selection of a digital media information segment, to determine whether the data file related to the selected segment is available at the receiver.

Typically, the receiving device comprises a request generation means arranged for generating a purchase request for purchasing a version of the selected digital media information segment.

The purchase request may comprise a primary request for a decryption key for decrypting the encrypted stored data file, if the determining means determines that the selected related file is available.

Typically, the purchase request comprises a secondary request for the encrypted stored data file to be made available for download to a storage location accessible by a personal computing device.

Preferably, the encrypted stored data file is made available for download by providing a link to the encrypted stored data file to the personal computing device.

Optionally, the encrypted stored data file may be sent to the storage location together with an associated decryption key.

In a preferred embodiment, the receiving device further comprises decrypting means arranged to decrypt the encrypted stored data file each time the data file is selected.

Preferably, the decryption means is arranged to utilise the decryption key to unlock the encrypted stored data file.

The system may further comprise a decryption key server arranged to receive and process the primary request, the decryption key server comprising a decryption key database arranged to store a decryption key corresponding to the related data file.

Typically, the decryption key server is arranged to encrypt and transmit the decryption key to the receiver for the related data file.

In a preferred embodiment, the system further comprises an authorisation server arranged to authorise the provision of a service for an operator of the receiving device.

Preferably, the decryption key server is arranged to request authorisation of the received primary request by transmitting an authorisation request to the authorisation server, the primary request and the authorisation request including identification data identifying the operator of the receiving device, the authorisation server being arranged to determine whether the operator of the receiving device is authorised to receive the decryption key, the authorisation server being further arranged to transmit an authorisation signal to the decryption key server, when the operator of the receiver device is authorised.

More preferably, the decryption key server is arranged to transmit the decryption key to the receiving device in response to receiving the authorisation signal.

The related data file may be stored at the decryption server, and the obtaining means of the system may be arranged to receive and store the related data file before the output means outputs the related data file.

According to another aspect of the present invention there is provided a method of enabling downloading a data file relating to a portion of a broadcast signal, the method comprising receiving at a receiving device, an information signal comprising a plurality of data segments associated with corresponding broadcast portions of a broadcast signal; receiving and storing an encrypted data file relating to one of the plurality of broadcast portions; selecting a data segment of interest; transmitting a request for a decryption key for the encrypted data file related to the data segment of interest; decrypting the encrypted data file using a received decryption key; making the encrypted data file corresponding to the data segment of interest available at an address location accessible to the user for download via a personal computer.

According to a further aspect of the present invention there is provided a digital information device arranged to receive an information signal from a digital broadcast information source, the digital information device being arranged to be used to select a segment of the information signal relating to a portion of a broadcast signal and to trigger and facilitate the download of a data file corresponding to the selected segment through a Wireless Local Area Network.

According to another broad aspect of the present invention, it is not always necessary to have the desired data file (music track for example) sent to the receiver. In this case, the digital audio, for example, is broadcast together with an information service relating to the content being broadcast. The information service which is derived from the playlist is used by the receiver to present options for the user to select and purchase recently played songs. The request, authorisation and confirmation of the purchase is carried out in a similar manner to that of the above described aspect of the present invention. However, rather than a decryption key being sent to the, receiver, the desired data file is simply made available to the user via the Internet and their internet enabled computer. Thus the receiver acts as a means for ordering data files relating to recently heard music tracks for example. Also this aspect could be applied to video clips broadcast to digital receivers which could be used subsequently to aid selection of a full video program or film which is then made available to the user via their PC.

This embodiment is hereinafter termed "DMD Lite" and clearly the advantages are numerous. For example, the receiver's data storage capacity can be reduced as the actual data files themselves are never stored on the receiver. Larger files such as digital films can be purchased by sending a shorter trailer to the receiver and the film to the PC if it is selected and paid for.

BRIEF DESCRIPTION OF THE DRAWINGS

Preferred embodiments of the invention will now be described, by way of example only, with reference to the accompanying drawings in which:

FIG. 9 is an overview of an exemplary playlist used with the system of FIG. 2;

DETAILED DESCRIPTION OF PREFERRED EMBODIMENTS

Figure 2:
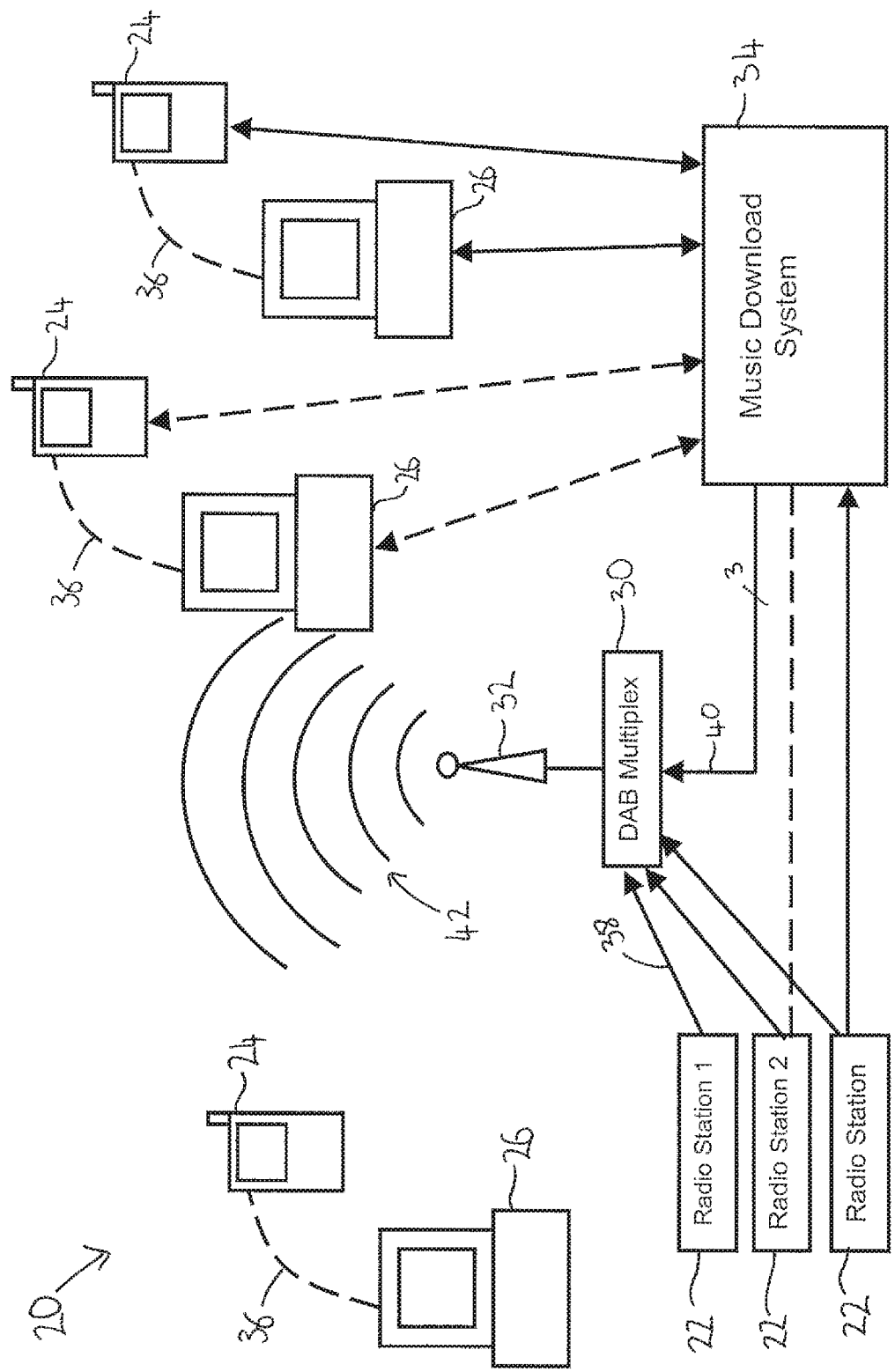
FIG. 2 is a schematic block diagram showing a system embodying the present invention.

One embodiment of the present invention allows listeners to purchase music tracks (data files) from a digital audio broadcasting (DAB) radio station as soon as they are broadcast. FIG. 2 shows a block diagram of the system 20 of the present embodiment. The system 20 comprises a plurality of radio stations 22, receiving devices (RD) 24 and personal computers (PCs) 26, a DAB multiplexer 30, an antenna network 32, and a music download system 34. The dotted lines 36 in FIG. 2, between the receiving devices 24 and the personal computers 26, represent that these devices are associated with the same user.

Music tracks and data files are used synonymously within the specification. A music track is one example of a data file. However, the present invention is not limited to the provision of music tracks for purchase. Throughout the specification where music track is used, the broader interpretation of data file is intended.

In this embodiment the receiving device 24 is a mobile telecommunications handset having a GPRS connection and also which includes a DAB receiver microchip, a relatively large data store for storing downloaded tracks and an application running on the receiver for displaying purchase options to the user and facilitating purchase request communications. However, in alternative embodiments the receiving device need only comprise a DAB receiver, a data store and some means to connect to a two-way communications channel. An example of this being a DAB radio having a WiFi connection to enable it to communicate wirelessly with the Internet. In further alternative embodiments, the receiving device need only be arranged to receive an information signal regarding music tracks being broadcast, to display such information, and related purchase options to the user, to facilitate user selection of desired music tracks for purchase and to construct a request for the desired music tracks.

DAB is a digital radio broadcasting system that enables multiple digital audio streams/signals to be broadcast on a single broadcast frequency. A group of DAB broadcasters transmitting multiple digital radio channels on a single radio transmission is called a DAB ensemble.

A DAB ensemble has a maximum bit rate which is divided into a plurality of channels, i.e. a channel for each broadcaster with each channel having an associated bit rate/data capacity. There is a direct relationship between the number of broadcasters in an ensemble and the audio quality: increasing the number of stations in an ensemble results in a lower quality audio stream, while increasing the audio quality results in fewer channels.

As shown in FIG. 2, the DAB multiplexer receives a digital audio stream 38 from each radio station 22, and a digital data bundle 40, comprising three data delivery streams, from the music download system 34: the DAB multiplexer 30 receiving a digital data bundle 40 for each radio station 22 utilising the music download system 34. The DAB Multiplexer 30, using compression and modulation techniques, broadcasts, via the antenna network 32, a complex radio transmission 42 which comprises the digital audio streams 38 and the digital data bundles 40. The three data delivery streams for each radio station 22 comprise: an encrypted data file corresponding to a music track/song being simultaneously broadcast by a corresponding one of the radio stations: metadata relating to that music track; and an information service message relating to the music track being broadcast by the radio station.

Figure 3:
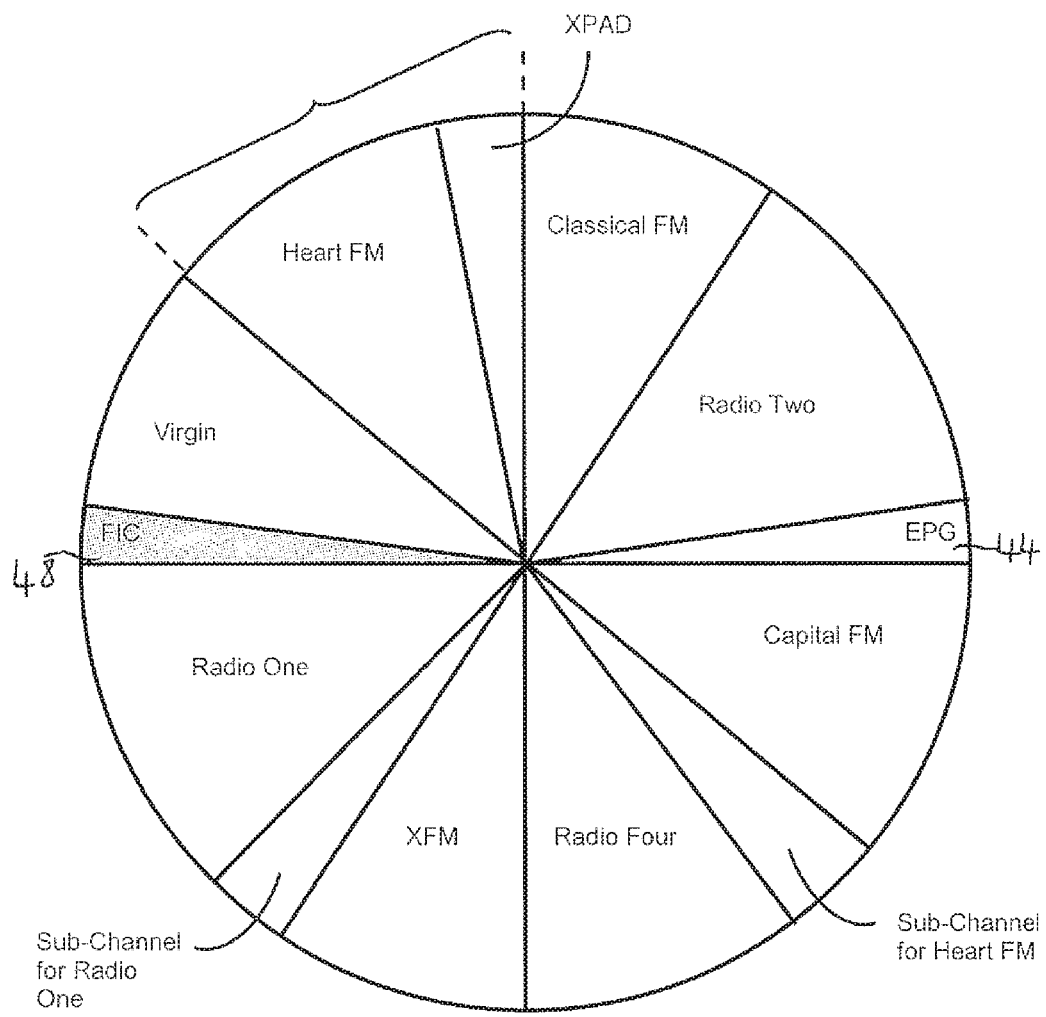
FIG. 3 is a snapshot in time of a data capacity chart of a DAB ensemble, showing the available bandwidth/data capacity broken down into a plurality of channels.

The complex radio transmission 42 is a modulated signal comprising each of the digital signals which make up the ensemble. FIG. 3 shows a how the available bandwidth/data capacity is broken down into a number of channels (one for each broadcaster). There may be a sub-channel 44 via which an electronic programming guide is transmitted and a plurality of further sub-channels 46 available for data transmissions.

Alternatively, data transmissions may be transmitted within the data capacity for each radio station's broadcast using programme associated data (PAD) techniques, such as extended programme associated data (XPAD)

In addition, there is a Fast Information Channel (FIC) 48 which carries information about all of the services within the DAB ensemble, e.g. radio station names, sub-channel allocation, the make-up of service components, and information about service components. The FIC 48 can be considered to be a table of contents and an index for the ensemble.

As shown, each channel may have a different data capacity and moreover, this data capacity may vary over time: FIG. 3 shows a snapshot. It is the DAB mulitplexer 30 which governs the data capacity of each channel within the total available bandwidth for the broadcast.

Figure 4:
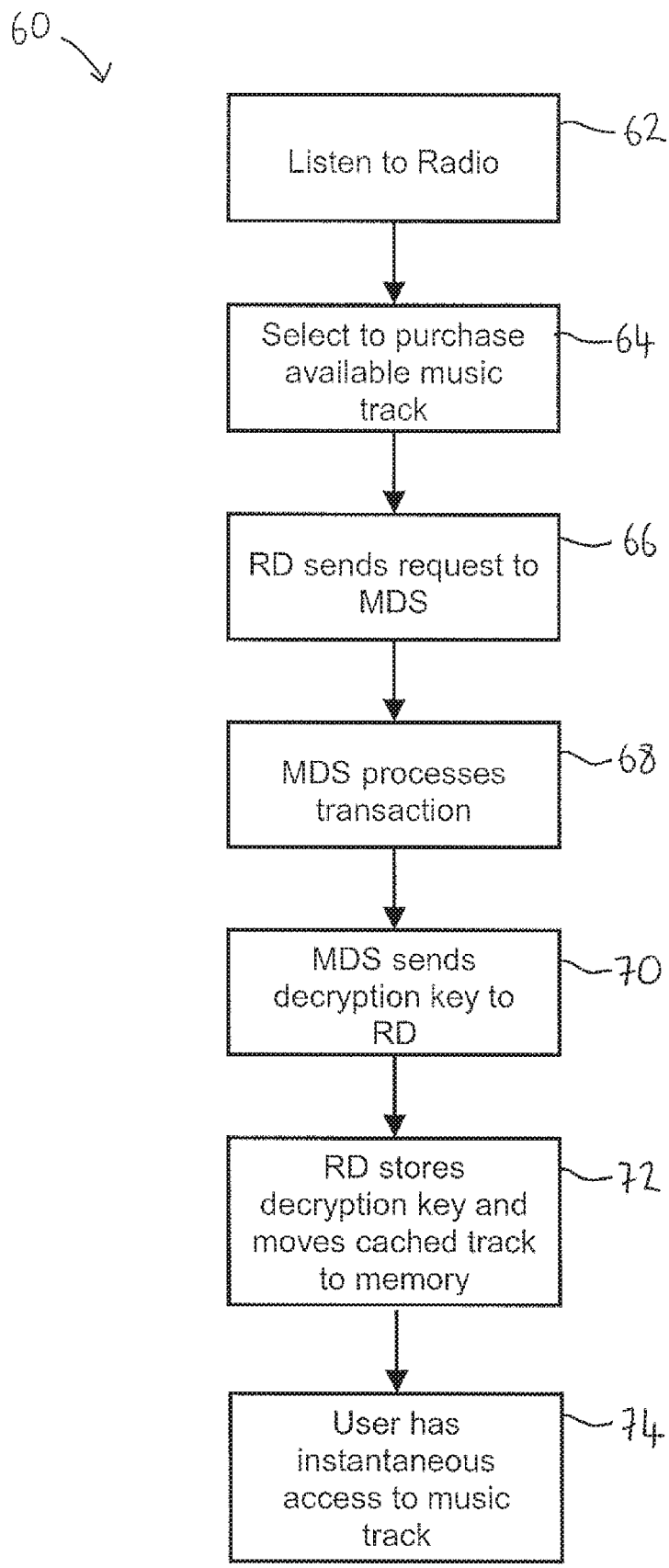
FIG. 4 is a flowchart showing the operation steps of a preferred embodiment of the present invention.

A brief overview 60 of the operation of a preferred embodiment of the present invention is described with reference to FIG. 4. The receiving device 24, described in detail below, operates in a radio receiving mode in which the complex radio transmission 42 is received and demodulated. The user selects, at step 62, to listen to one of the radio stations 22 and that radio station's audio stream 38 is output/played to the user. The audio stream 38 may be played via audio output module, i.e. a loudspeaker of the receiving device or through an external output device such as earphones or one or more loudspeakers.

Simultaneously, as the user is listening to the audio stream 38, the receiving device 24 is receiving and storing an encrypted data file/music track from the data sub-channel. The receiving device 24 stores the received encrypted music track in its cache memory on a temporary basis. A detailed description of this process is provided later.

Through a graphical user interface (GUI) of a media application running on the receiving device 24, a user is presented with an option for purchasing one or more of the music tracks, such that it is semi-permanently stored on the receiving device 24 to be played back at the user's leisure. The user may be presented with options for purchasing the currently playing song and a plurality of previously played songs.

Upon selecting, at step 64, to purchase a music track, the receiving device 24 makes, at step 66, a request to the music download system 34. The request is made via a narrowcast communications back-channel 67, for example using General Packet Radio Service (GPRS). Next the music download system receives the request and a purchase transaction is processed, at step 68. After a successful transaction, the music download system 34 transmits, at step 70, via the narrowcast communications back-channel 67, a decryption key back to the receiver 24 to enable the decryption of the stored encrypted stored music track. The decryption key forms part of a license, together with a rights object, which governs how the content of the music track can be used, i.e. the number of times it can be played, an expiry date and the number of times the content can be copied, for example on to a CD.

The decryption key is itself encrypted so that it can only be decrypted by the device which is used to purchase the track. One way in which the encryption of the decryption key may be achieved is through the use of public and private keys.

The receiving device 24 then stores, at step 72, the encrypted decryption key in a secure semi-permanent memory location and transfers the related encrypted music track from the temporary location in cache memory to a music track library in a semi-permanent memory location.

The music track is made available, at step 74, to the receiving device 24 substantially instantaneously because the music track is transmitted at the same time as the song is being played via the audio stream 38. Certainly receipt of the decryption key takes a far shorter period of time than receipt of the corresponding data file due to the difference in size of the respective data. This is advantageous because the time taken to make the music track available to the user is minimised, being far shorter than in the prior art systems, and providing the user with "instant gratification".

The media application, running on the receiving device 24, subsequently permits a user to select to play the stored encrypted data track at their leisure. When selected the audio application retrieves the decryption key from memory, uses the decryption key to decrypt the music track, and plays the track via the output audio module.

Figure 1:
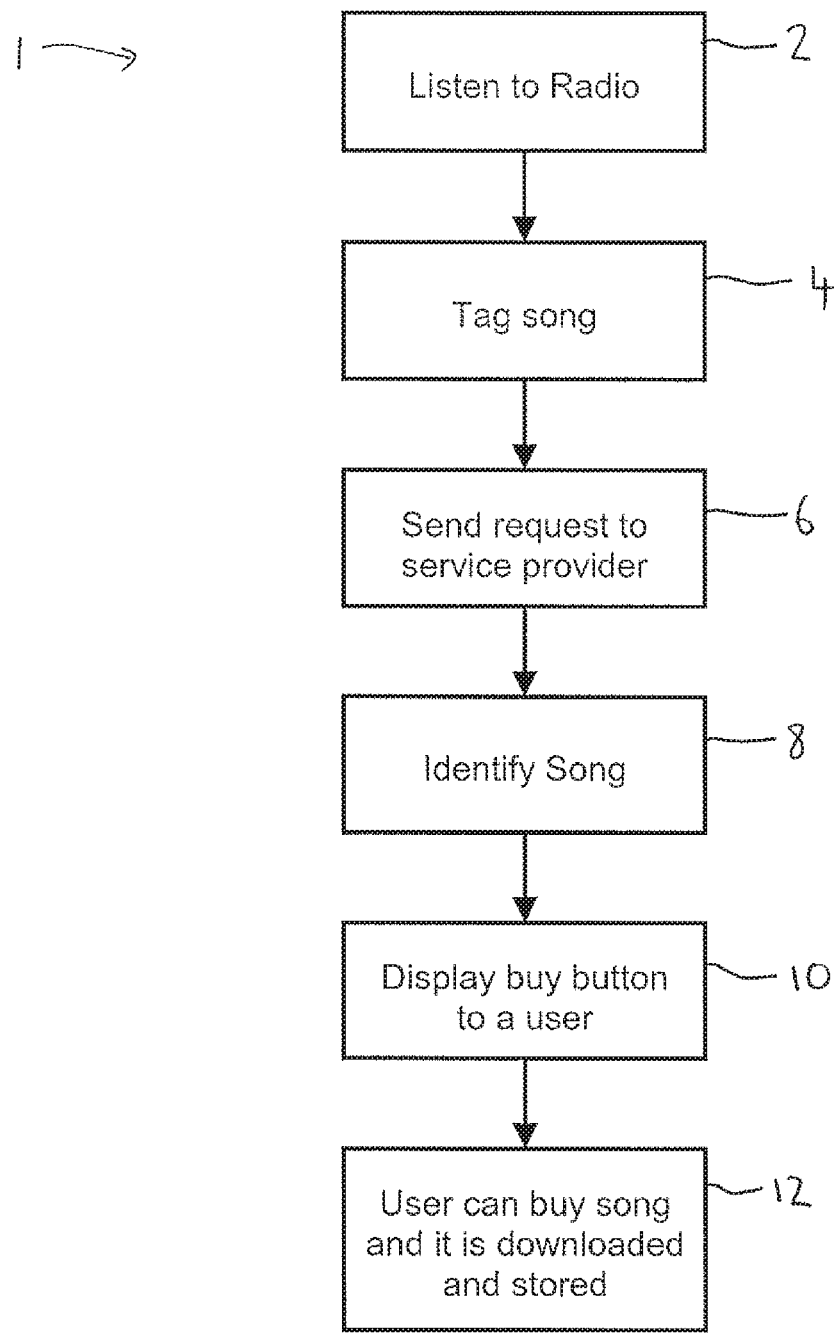
FIG. 1 (prior art) is a flow chart showing an overview of a known method for downloading music to a receiving device.
Figure 5:
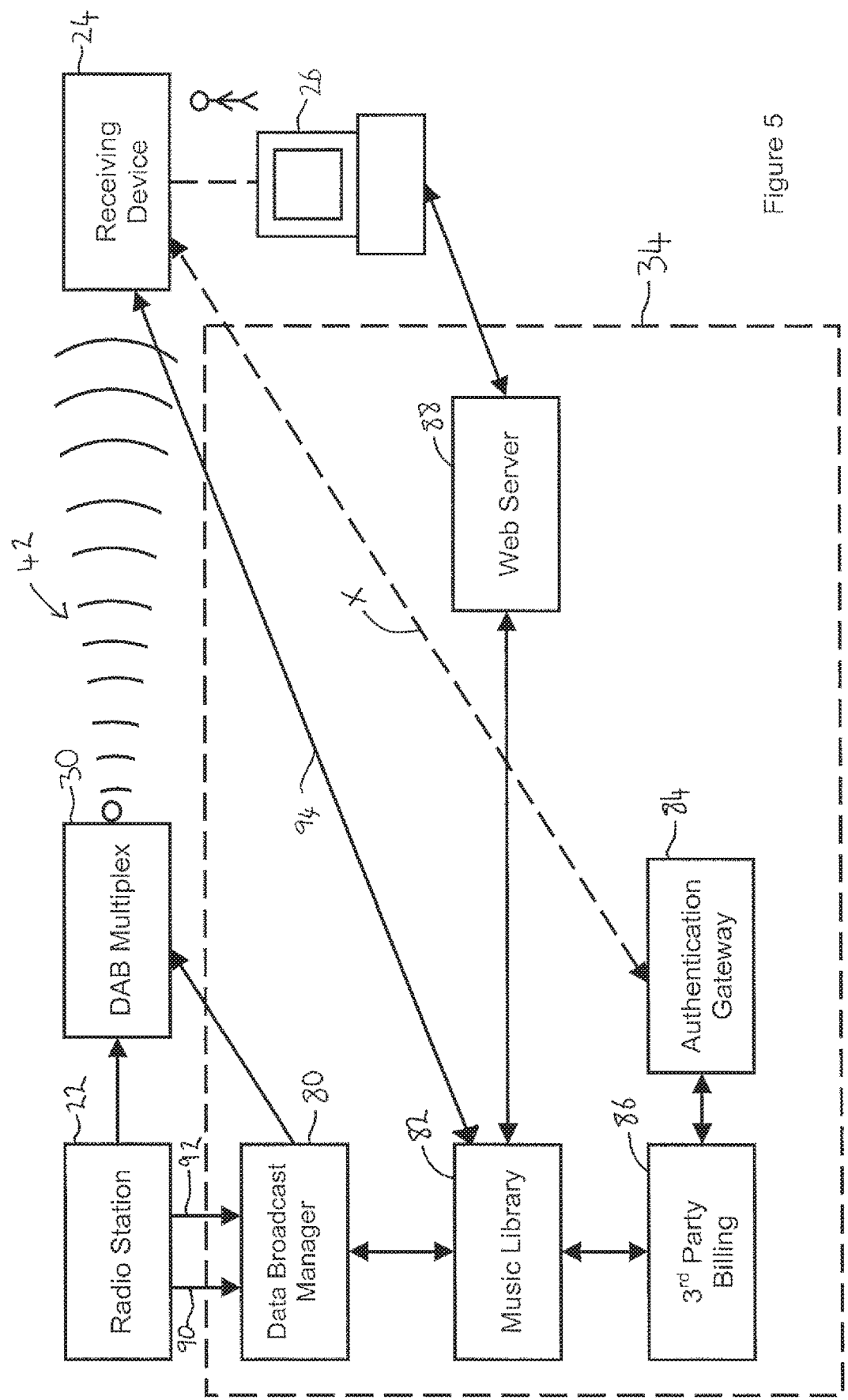
FIG. 5 is a detailed schematic block diagram showing the components of a music download system shown in FIG. 2.

FIG. 5 shows a detailed block diagram of the components of the music download system 34. In addition to the radio station(s) 22, DAB multiplex 30, receiving device(s) 24 and PC(s) 26 shown in FIG. 1, the composition of the music download system 34 is shown. The music download system 34 comprises a data broadcast manager (DBM) 80, a music library (ML) 82, an authentication gateway 84, a third-party billing system 86, and a web server 88.

The data broadcast manager 80 receives digital information 90 relating to the audio tracks to be broadcasted from the radio station 22. The digital information is in the form of a playlist (see FIG. 9) which details the music tracks that will be played and an indication of their timing. The data broadcast manager 80 also receives advance warning notification from the radio station when new music tracks are to be added to their play-catalogue and a notification message (trigger signal) 92 from the radio station 22 (although in other embodiments, this message can originate from another source) at the time a music track is broadcast via the audio stream 38.

The music library receives music tracks from a plurality of record companies (not shown). The music tracks are compressed using, for example, Windows Media Audio, and encrypted using, for example, Windows Media Digital Rights Management (DRM). The data broadcast manager uses the advance warning notification to request encrypted data files, corresponding to music tracks, from the music library. Alternatively, the data broadcast manager may, when it receives a playlist (running order list) 90 from a radio station 22, cross-check whether the music tracks listed within the playlist are available to the data broadcast manager 80. If they are not, the data broadcast manager 80 can request the encrypted data files from the music library 82. In this way, the received playlist 90 acts as a means to ensure the tracks to be played are available at the data broadcast manager 80.

The music library 82 also supplies associated track metadata, for example album graphics, song lyrics, price information, and/or additional information to the data broadcast manager. The track metadata is transmitted together with the encrypted data file and used as part of an information service which provides the receiving device with additional information for the user, and facilitates control of the purchase offers made to the user.

The data broadcast manager transmits, within the data delivery streams, the encrypted data files, track metadata and the information service to the DAB multiplexer such that they are broadcast synchronously with the audio stream from the radio station.

The receiving device 24 can communicate with the music library via the GPRS back-channel 94 in this embodiment. A purchase request message can be created and transmitted from the receiving device 24 to the music library 82. Upon receipt of the purchase request from the receiving device 24, the music library 82 forwards the request to the third party billing system 86, which carries out a payment transaction in association with the authentication gateway 84. The purchase request from the receiving device 24 includes at least one unique identifier ID for the receiving device 24 and the authentication gateway 84 uses this information in order to verify that the receiving device/user 24, is authenticated to use the service.

When the receiving device is authenticated, the third party billing system 86 carries out a payment transaction. There are three primary methods for which payment for a music track can be achieved, including: (i) deducting an amount from a pre-paid stored value, i.e. a pay-as-you-go credit value; (ii) passing a charge for the music track to the users mobile phone bill, via the user's network operator (i.e. Vodafone, O2, Orange etc); and (iii) debiting an account, the account details of which are determined during a registration process.

Depending on the result of the authentication and billing processes, the music library 82 either transmits back, via the GPRS back-channel 94, a decryption key to the receiving device 24, or a message stating that the transaction was unsuccessful.

The user's PC 26 can also communicate with the music library 82 via the Internet. The PC 26 communicates with the web server 88 which in turn communicates with the music library 82. By providing a connection to the user's PC 26, downloaded tracks for which a decryption key has been sent to the user's receiving device 24 can also be made available in parallel for conventional downloading to the user's PC 26 without further charge. This enables the user to transfer the purchased track to other media such as a CD (Compact Disc) as required.

Figure 6:
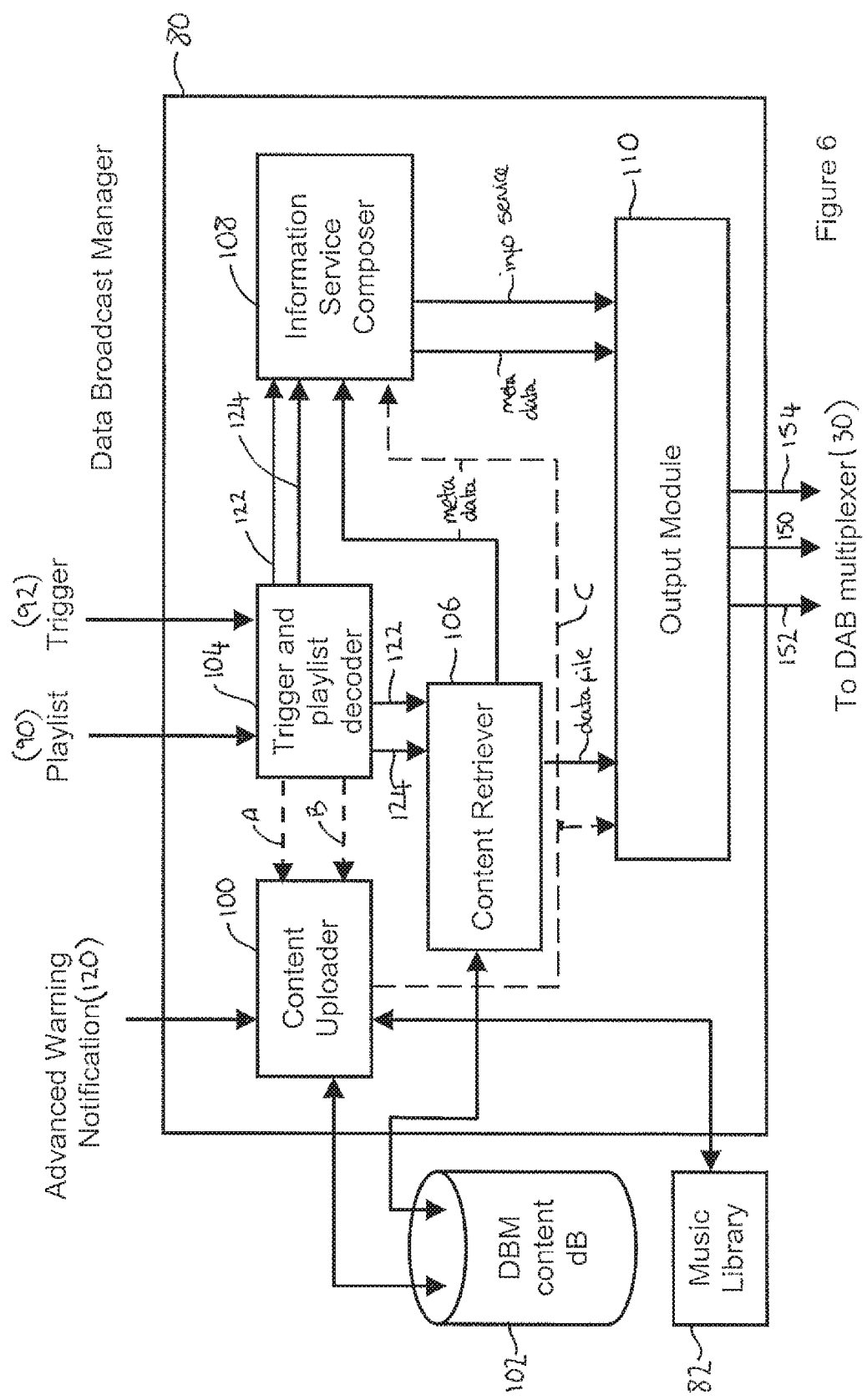
FIG. 6 is a schematic block diagram showing the functional components contained within a data broadcast manager of FIG. 5.

FIG. 6 shows a block diagram of the functional components contained within the data broadcast manager 80. As shown, the data broadcast manager 80 comprises: a content uploader 100, for uploading the music tracks into a DBM content database 102; a trigger and playlist decoder 104, for identifying track title, artist name and radio station information from within a trigger signal 92 or playlist 90; a content retriever 106, for retrieving music tracks and associated track metadata files from the DBM content database 102 in response to a trigger signal 92 from a radio station; an information service composer 108, for composing an information service message relating to the music tracks being broadcast; and an output module 110 for controlling the three data delivery streams to be passed to the DAB multiplexer 30 for transmission.

Figure 7:
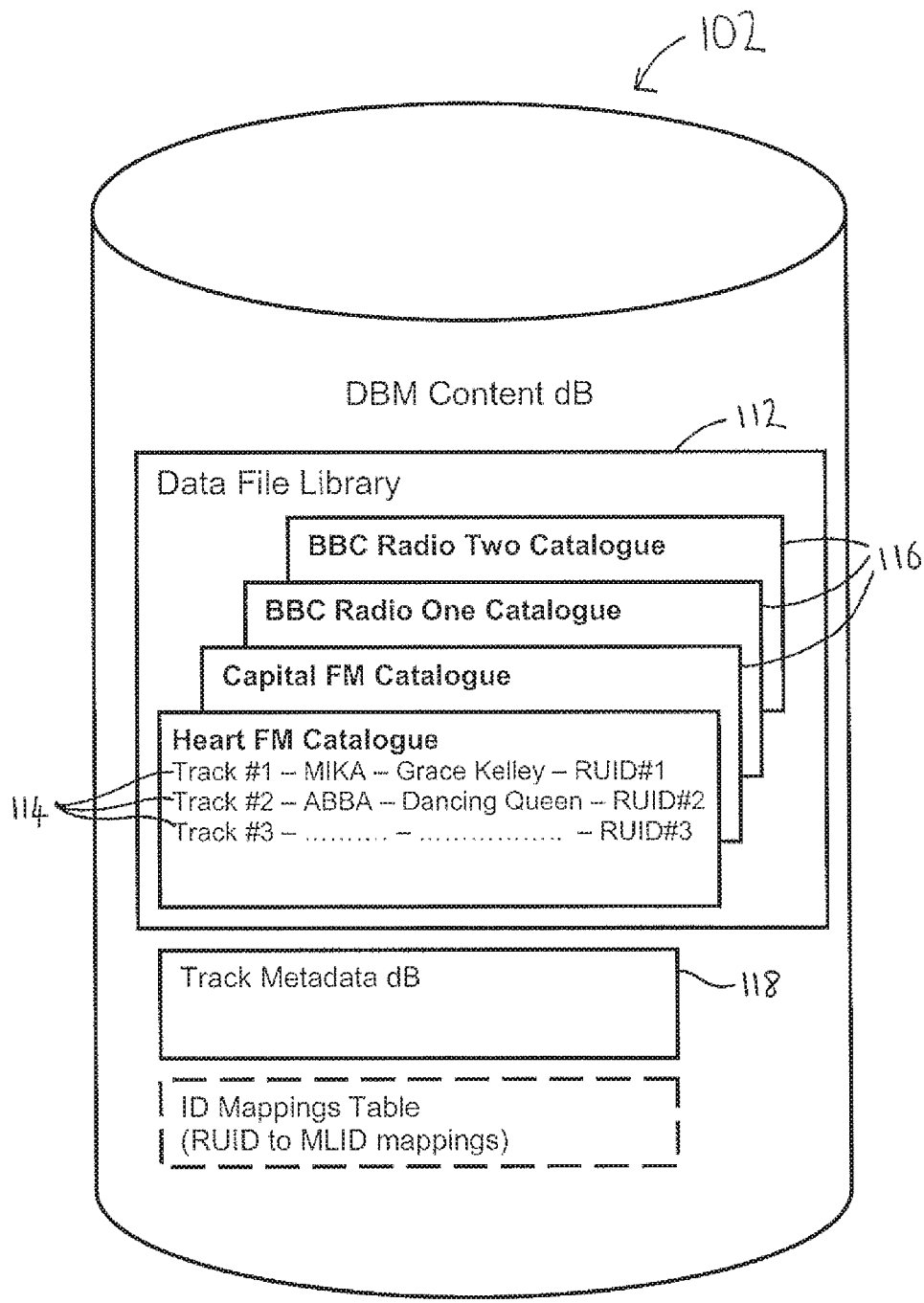
FIG. 7 is a schematic diagram showing a DBM content database of FIG. 6.

The data broadcast manager 80 has access to the DBM content database 102, a schematic diagram of which is shown in FIG. 7. The DBM content database 102 comprises a data file library 112, for storing data files 114 associated with music tracks. The data file library 112 comprises a plurality of data file catalogues 116 which are associated with each radio station 22. The DBM content database 102 also comprises a track metadata database 118 for storing track metadata associated with the data file (music track) 114.

It is to be appreciated that the data files and track metadata could be organised in a plurality of different ways. For example, the data files and associated track metadata may be stored within one catalogue which serves all of the radio stations. This would advantageously reduce the volume of storage required as there would be no requirement to store multiple copies of the same music track. In this embodiment, a catalogue table must be kept up-to-date and detail all the music tracks each radio station is permitted to sell.

The data broadcast manager 80 receives playlists 90 and trigger signals 92 from a plurality of different radio stations 22, and each radio station 22 may format this information differently. The trigger and playlist decoder 104 identifies from both the playlists 90 and trigger signals 92, information regarding track titles, artist names and the radio station providing the playlist or trigger signal.

In the present embodiment, the content uploader 100 receives an advance warning notification 120 concerning new music tracks that are to be broadcast by the radio station 22. The advance warning notification 120 is typically received by the content uploader 100 a few days before the broadcast is due to take place. Typically the music library 82 obtains and encrypts the new music tracks prior to them being requested by the data broadcast manager 80. The advance warning notification 120 of new music tracks typically includes a music track title, an artist name and may include a radio station unique identifier (RUID) for each new music track. The content uploader 112 uses the track title and artist name information within the advance warning notification 120 to request copies of the music tracks from the music library; these are subsequently stored in the DBM content database 102. The content uploader 100 also requests and receives track metadata associated with each music track and stores it in the track metadata section 118 of the database.

As shown in FIG. 7, within the DBM content database 102 the music tracks are stored in catalogues 116, each catalogue being associated with one radio station. The reason for this relates to the purchase of the music tracks, because radio stations 22 can only sell music tracks which have been added to their catalogue.

The music tracks are uploaded and stored within each data file catalogue 116 only once: although, music tracks may appear in more than one data file catalogue 116.

The track metadata is uploaded from the music library 82 at the same time as the track file, and again this is only done once for each track rather than each time the track is played or each time the track appears in a playlist 90.

The information service composer 108 composes a service message which is interpreted by a receiving device 24 to determine the currently playing track, and may also include a list of music tracks which have recently been played and an indication of the upcoming tracks which are most likely to be played. This message is generated on the basis of information provided within playlists 90 and trigger signals 92 received from radio stations 22.

The information service, when displayed on the receiving device 24, integrates track metadata associated with each music track together with the music track details, i.e. track title and artist name, to provide a visual indication of which tracks are available for purchase, and to provide a graphical user interface which allows a user to select to purchase available music tracks. This is described in more detail later. Available in this sense includes directly to the receiving device 24 and also to a PC 26.

The content retriever 106 receives a decoded version of the trigger signal 122 from the trigger and playlist decoder 104 and retrieves the corresponding music track 114 and track metadata from the DBM content database 102. The music track 114 is passed to the output module, which also received the track metadata and information service via the information service composer 108.

The output module 110 controls the streaming rate of all three data streams and, without exceeding the data transmission rate for the selected data channel (typically a sub-channel within the ensemble), the data output module 110 transmits these data streams to the multiplexer for transmission.

Each functional block within the data broadcast manager 80 shown in FIG. 6 is described in detail below.

As described above, the trigger and playlist decoder 104 identifies from the received playlists and trigger signals 90, 92, information regarding track titles, artist names and the radio station 22 initiating the playlist or trigger signal 90, 92. The trigger and playlist decoder 104 determines a decoded trigger signal 122 and a decoded playlist 124, both of which are passed to the content retriever 106 and the information service composer 108.

The trigger signal 92, from the radio station 22, indicates when a track has commenced transmission in the audio stream 38. The trigger signal 92 is a Hypertext Transfer Protocol (HTTP) post which identifies the track currently playing in the audio stream. The HTTP post identifies the radio station 22 and the track title and the artist name.

Figure 8A:
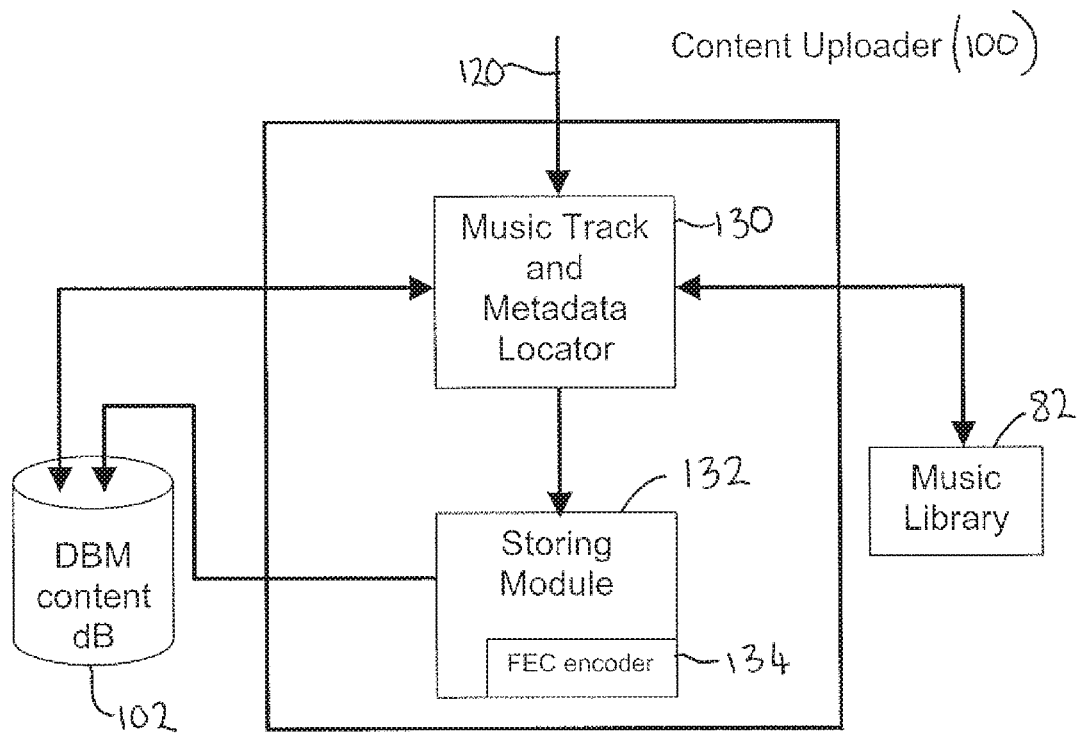
FIG. 8a is a schematic block diagram showing the functional components contained within a content uploader of FIG. 6.

As shown in FIG. 8a, according to one embodiment, the content uploader 100 comprises a music track and metadata locator 130, for finding new music tracks within the music library 82, and a storing module 132 for storing found data files in appropriate locations within the DBM content database 102.

The content uploader 100 has the necessary permission rights to access and search through the music library 82 for new music tracks in response to the advance warning notification 120. The advance warning notification 120 comprises a list of artist names and track titles. The music track and metadata locator 130 searches through the music library 82 to find data files which match the artist names and track titles listed within the advance warning notification 120. Matching files are copied from the music library 82 and passed to the storing module 132.

The storing module 132 comprises a forward error correction (FEC) module 134 for applying FEC to each music track 114 at the time the music track is uploaded from the music library 82. In another embodiment, FEC is also applied to the metadata before it is stored in the DBM content database 102.

After FEC is applied, the storing module 132 stores each music track 114 in the associated data file catalogue 116 in relation to a music library identifier (MLID) for each new track. The storing module 132 also stores the track metadata within the track metadata database 118 in relation to the corresponding music track, i.e. there is a relational link between the music track and the track metadata such that when the music track 114 is retrieved by the content retriever 106 (described later) the corresponding track metadata is also retrieved.

If the music library 82 does not have a version of the new track, the data broadcast manager 80 can request that the music library obtain a version using a notifying module (not shown). The data broadcast manager 80 is subsequently informed by the music library 82 when the music track 114 becomes available in the music library. The music track and metadata locator 130 and storing module 132 are then able to retrieve and store the music track as described above.

Figure 8B:
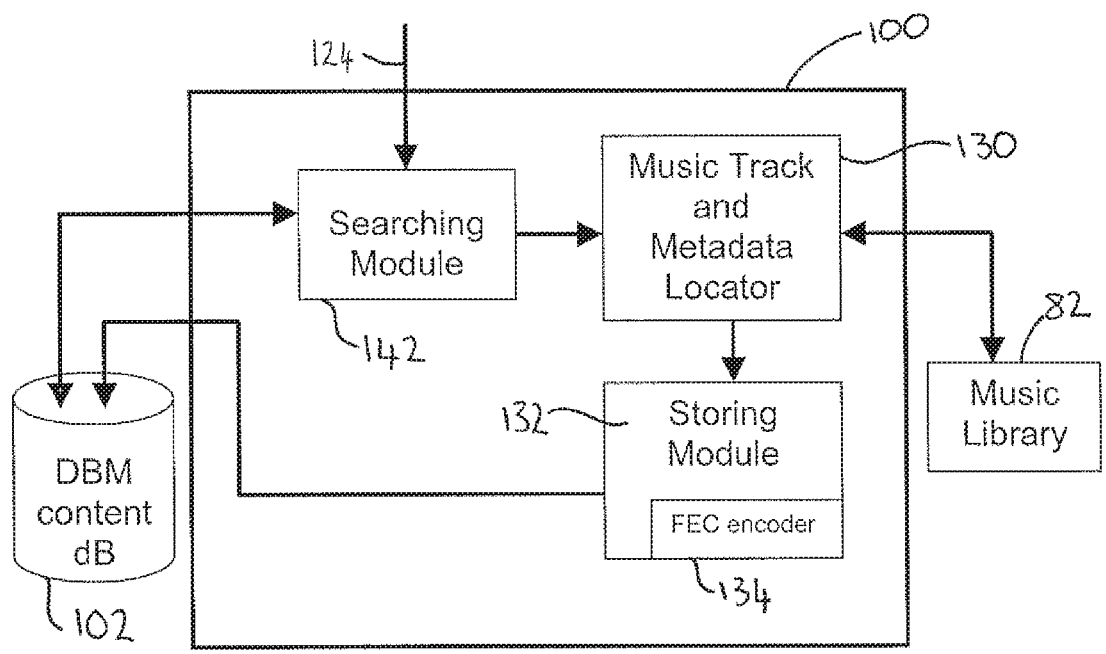
FIG. 8b is a schematic block diagram showing the functional components contained within an alternative content uploader of FIG. 6.

The above description of the content uploader 100, in relation to FIG. 8a relates to the embodiment where an advance warning notification 120 is received. In another embodiment, there is no advance warning notification 120 and the content uploader 100 uploads new music tracks as they are identified in the playlist 90 of a radio station. FIG. 8b relates to the content uploader 100 of this embodiment where there are no advance warning notifications 120, and FIG. 9 shows an overview of a typical playlist 90. The playlist 90 includes data relating to: the identity 136 of the radio station 22, a list of music tracks to be played, and an indication of their order, start times 138 and duration 140.

As shown in FIG. 8b, the content uploader 100 comprises the music track and metadata locator 130 and storing module 132 of FIG. 8a and further comprises a searching module 142, for searching the data file catalogue 116 to identify if a music track 114 is already stored within that data file catalogue 116.

The searching module 142 receives a decoded version of the playlist 124 from the radio station 22 in advance of the music tracks being broadcast in the audio stream, as represented by a first dashed line A in FIG. 6. Typically, the playlist 90 is received a few hours before broadcast. The searching module 142 uses the track title and artist name details from within the decoded version of the playlist 124 to perform the search.

If the searching module 142 determines that a music track 114 within the playlist is already stored within the appropriate data file catalogue 116 no further action is required in relation to that track. However, if the searching module 142 does not find the music track within the data file catalogue 116, the music track and metadata locator 130 and the storing module 132 operate as detailed above in order to retrieve and store the required music track and track metadata.

It is to be appreciated that the playlist 90 may contain a list of any number of upcoming music tracks. Typically, the playlist 90 may contain a list of twenty upcoming music tracks.

Figure 10:
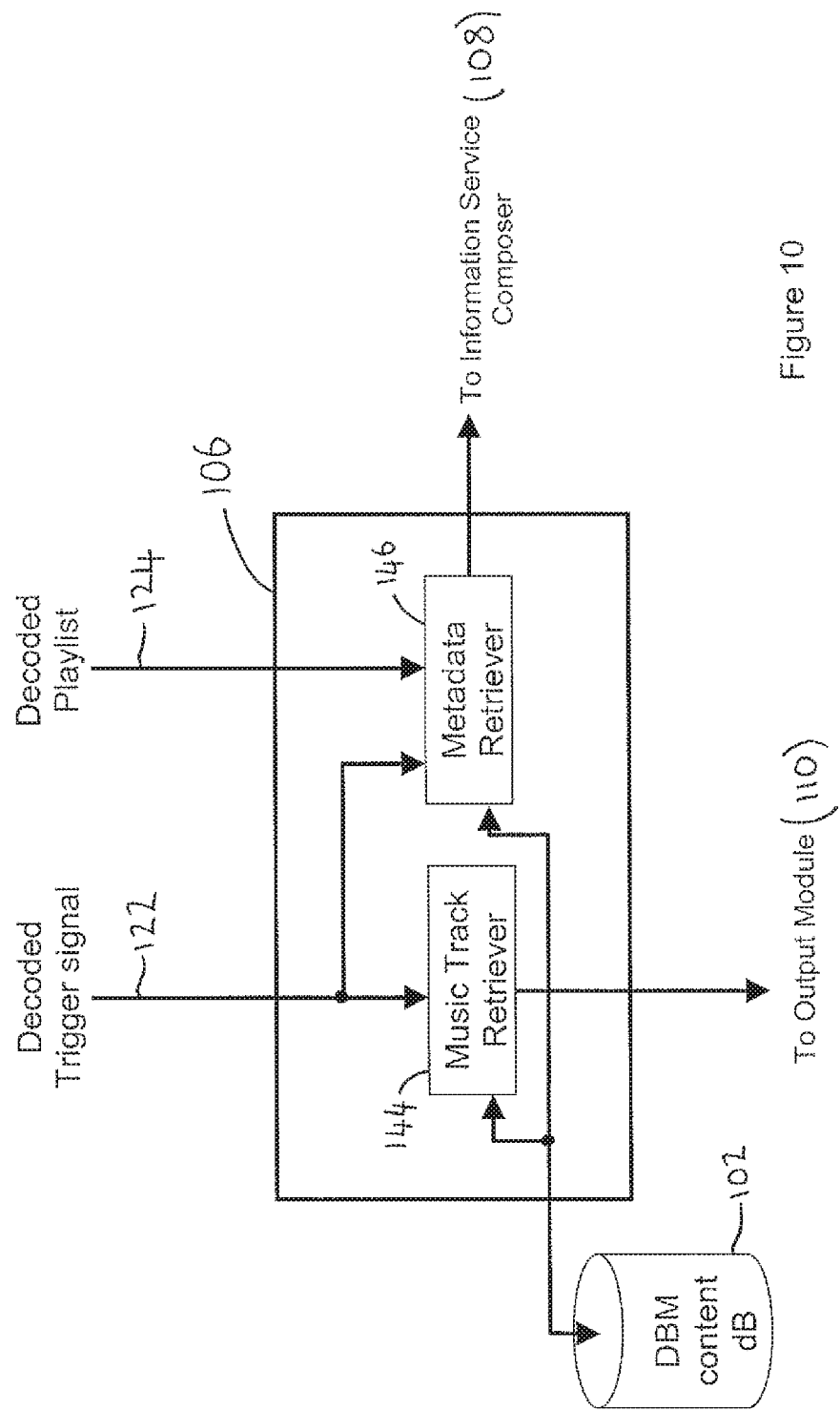
FIG. 10 is a schematic block diagram showing a content retriever of FIG. 6.

As shown in FIG. 10, the content retriever 106 comprises: a music track retriever 144, for retrieving the identified music track from the DBM content database 102; and a metadata retriever 146, for retrieving the track metadata associated with the music track.

The track retriever 144 uses the track title, artist name and radio station information from the decoded trigger signal 122 to find a data file corresponding to the identified track within the data file catalogue 116 corresponding to the identified radio station 22, 136. When found, the music track retriever 144 forwards a copy of the data file to the output module 110, for output to the multiplexer 30.

The metadata retriever 146 uses the track and artist information, identified in either the decoded playlist 124 or decoded trigger signal 122 to find track metadata corresponding the identified track within the metadata database 118. A copy of the track metadata, once retrieved, is passed to the information service composer 108.

As described above, the track metadata includes graphics, song lyrics, price information, and additional information about the data file/music track.

The graphics may include pictures of artists as well as music track and album graphics. Small graphics (50.times.50 pixels, typically 2 kB) may be used by the graphical user interface when a list of available tracks is displayed, and large graphics (100×100 pixels, typically 4 kB) may be displayed when a particular music track is selected.

The track metadata is passed to the information service composer 108 because the information service contains references to the track metadata such that construction of the information service, at the receiving device, pulls the relevant track metadata together in order to generate and display the required information to the user.

In the present embodiment, the track metadata is broadcast by the multiplexer 30 with the encrypted data file 114, and the information service, using interleaving techniques, further described below.

The information service determines what will be displayed to the consumer at the receiving device 24 and contains a list of the music tracks which have previously been broadcast, the currently playing music track, and may also include an indication of which music tracks are likely to be played in the near future, i.e. upcoming tracks.

The receiving device 24, as described below, decodes the information service and, via the graphical user interface, displays to the user the content in the information service, including a list of the music tracks which are available for purchase.

The information service enables graphics to be displayed alongside textual information and contains price information for the music tracks that are available to buy. The information service may also provide additional information and enable music tracks to be grouped and listed, e.g. the last five music tracks played or the top 10 downloaded songs. Additional content broadcast via the information service may comprise information about, and links to, other merchandise, i.e. screensavers, ring tones etc and/or news and travel information.

The information service is contained within an information service delivery stream and is outputted by the output module each time the information changes and is subsequently refreshed at predetermined configurable intervals, for example, every fifteen seconds.

As the information service displayed at the receiving device 24 contains a list of previously played songs, the currently playing song, and a list of upcoming songs, a metadata stream 150 output by the output module 110 provides over time, metadata for all of the tracks listed within the information service. Typically, the track metadata is broadcast when the corresponding music track is broadcast and is then subsequently rebroadcast periodically during the time that the track remains on the previously played list within the information service.

The output module 110 is the functional module which outputs the three delivery streams, a data file stream 152, the track metadata stream 150 and an information stream 154, which are transmitted to the DAB multiplexer 30, to be broadcast together in a single data stream together with the audio streams 38 from the radio stations 22. The output module 110 of FIG. 6 shows three output delivery streams 150, 152, 154 (a digital data bundle 40) relating to one radio station 22. It is to be appreciated that there will be a digital data bundle 40 for each radio station 22 which is being serviced by the music download system 34.

The output module 110 is arranged to control the streaming rate of the three different streams 150, 152, 154 to make sure that when they are all combined at the DAB multiplexer 30, the maximum data capacity is not exceeded, i.e. where the broadcast of the digital data bundle 40 is via a sub-channel of the ensemble (of a known maximum data capacity), the output module 110 ensures that the data capacity of the sub-channel is not exceeded by restricting the streaming of digital data within the digital data bundle 40.

Each of the delivery streams 150, 152, 154 are divided into user datagram protocol (UDP) packets and these packets are transported in data groups using DAB Enhanced Packet Mode. The IP address and root port for the service will be signalled in the DAB Fast Information Channel 48.

Different UDP port numbers are used for the three file delivery streams 150, 152, 154. This enables interleaving of files in the broadcast, i.e. a smaller file can be transmitted in the middle of a larger file. In UDP protocols, a port is a special number present in the header of a data packet. These port numbers are used to map the data received by the receiving device 24 to a particular process. For example, the data file packets and the track metadata packets will be handled by different processes in the receiving device, and the port number in the header of the data packets will be used to determine which data is associated with which process. This may be considered loosely analogous to simulating the effect of broadcasting multiple streams of data.

A root port number is used to discover and retrieve the entire content of the broadcast. An XML document, giving a directory of delivery streams available and their port numbers, is transmitted on the root port.

The data within each UDP packet is divided into further packets which are governed by a DBM file delivery protocol (DFDP). Delivery metadata relating to the broadcast delivery, which allows the format of the delivery of the UDP packets to be understood, is sent in DFDP headers.

This delivery metadata enables the receiving device to re-build the received files and to decode the forward error correction.

Figure 11:
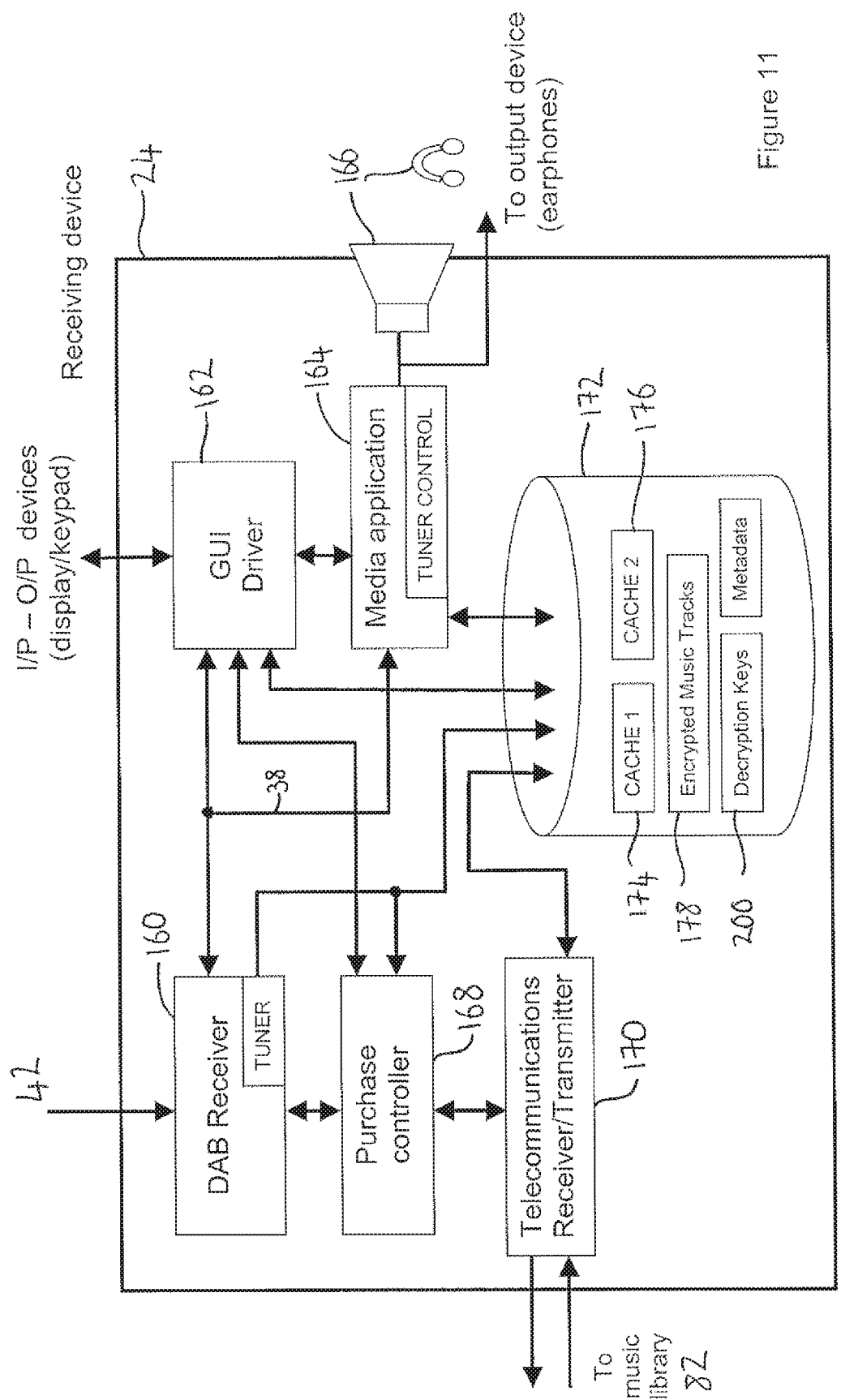
FIG. 11 is a schematic block diagram of a receiving device of FIGS. 2 and 5.

As shown in FIG. 11, the receiving device 24 comprises a DAB receiver 160, a graphical user interface (GUI) driver 162, a media application 164, audio output module 166, a purchase controller 168, a telecommunications receiver/transmitter 170, and data store (memory) 172.

The DAB receiver 160 receives the DAB broadcast 42, enables the data files to be stored temporarily in a first cache memory 174 of the data store 172, and outputs the audio stream 38 to the media application 164, to be outputted to the user via an output device 166, for example, via a speaker or earphones. The DAB receiver 160 also uses the information service stream 154 to provide the user with information, via the GUI driver 162, regarding the received data files and services.

The data files 114 are stored in the first cache memory 174 on a continuous basis for as long as the DAB broadcast 42 is received. However, the first cache memory 174 has a finite capacity and as new data files are received the oldest data files are overwritten. As a result, the first cache memory 174 only stores the most recently broadcast data files 114.

When a user selects to purchase an available track 114, the purchase controller 168 moves the selected data file 114 into a second cache memory 176 of the data store 172, such that as the transaction takes place the selected data file is prevented from being overwritten. At the end of a successful purchase transaction, the purchase controller 168 moves the purchased data file from the second cache memory into a more permanent memory location 178 of the data store of the receiving device 24, for example, the data file may be transferred onto an SD memory card, and can be played back at the user's leisure.

The telecommunications receiver/transmitter 170 enables communication between the receiving device 24 and the music library 82 and transmits authorisation requests and stores received decryption keys in the data store 172. The purchase controller 168 controls the communications between the receiving device 24 and music library 82.

The media application 164 facilitates the output of media content (radio, stored audio, or video) to the user, and operates in a radio mode and a normal audio mode. In the radio mode, the media application 164 (tuner control) controls which radio station 22, i.e. which frequency, the DAB receiver 160 tunes into. The media application 164, in this mode, receives the audio stream 38 from the DAB receiver 160, processes the signal, and outputs the audio stream 38 via an output device 166, such as a loudspeaker or earphones.

In the normal audio mode, the media application 164 retrieves, upon user selection, a stored encrypted audio file 114 from the data store 172. The media application also retrieves a corresponding stored decryption key for the selected stored encrypted audio file and will decrypt the stored encrypted data file, to create an audio stream for audio output, each time the music track is to be played. This prevents unencrypted versions of the music track being shared between a plurality of users who have not purchased the music tracks and as such do not own the necessary licence.

The GUI driver 162 controls the input and output of data, from and to, the user. The GUI driver 162 provides the user with selectable options and details the music tracks which are available for purchase. Similarly, the GUI driver recognises the user's selections and passes appropriate control signals to the remaining modules within the receiving device 24.

Figure 12:
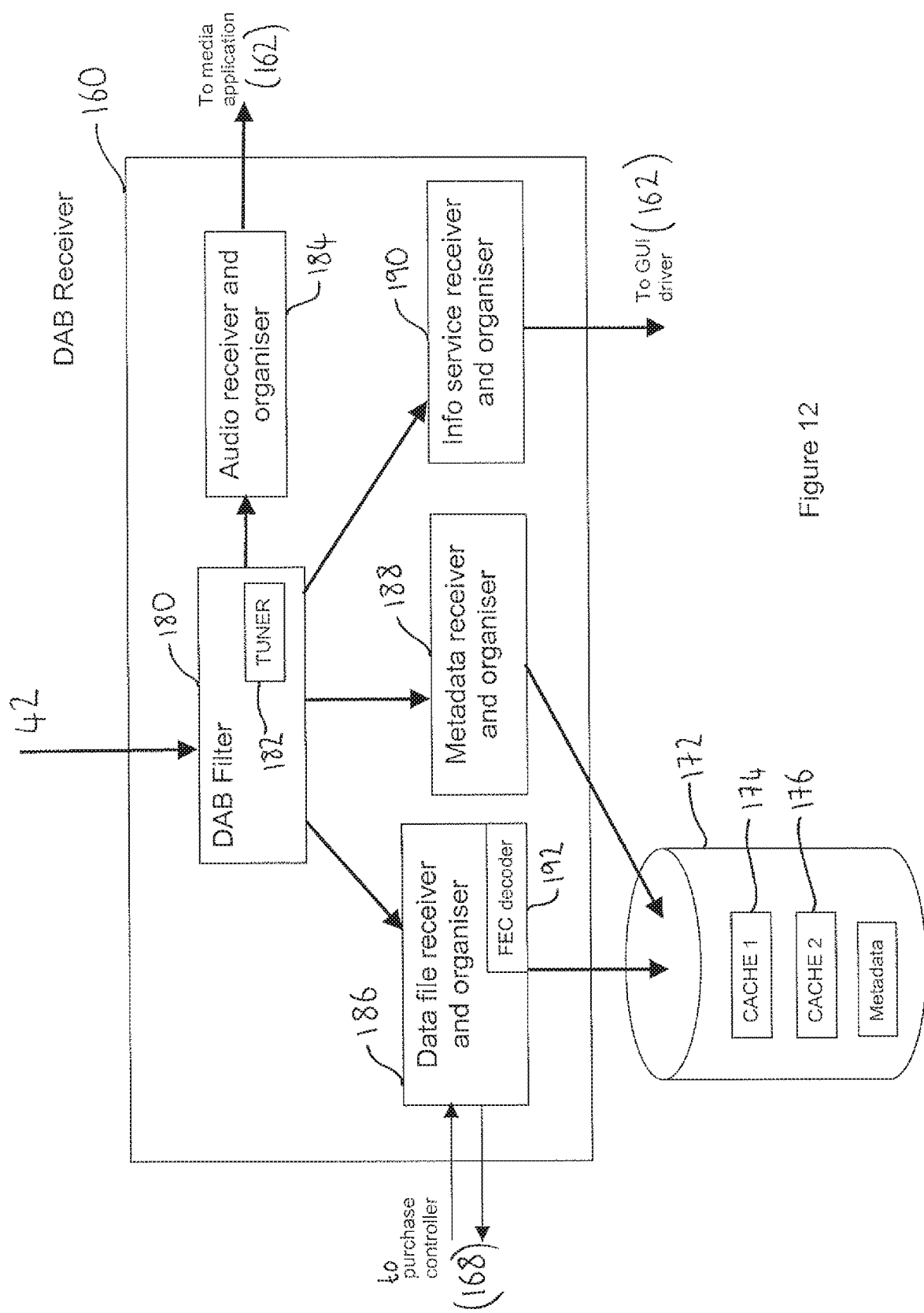
FIG. 12 is a schematic block diagram of a DAB receiver of FIG. 11.

As shown in FIG. 12, the DAB receiver comprises a DAB filter 180 and tuner 182, an audio receiver and organiser 184, a data file receiver and organiser 186, a track metadata receiver and organiser 188, and an information service receiver and organiser 190. The DAB filter 180 receives the XML file which contains the instructions for reconstruction of the data packets received via the DAB broadcast 42.

The DAB filter 180 and tuner 182 receives the DAB stream relating to the user selected radio station.

The data file receiver and organiser 186 receives the data file packets and re-creates the file, according to the delivery metadata in the DFDP header. The data file receiver and organiser 186 comprises an FEC decoder 192 which facilitates regeneration of any missing packets. If any packets have been lost, the FEC decoder 192 regenerates missing packets on the basis of packets which have been correctly received. Extra packets are sent at the end of each file to make this possible. When the data file is complete and the data packets have been placed in the correct order, the data file is stored in the first memory cache 174.

Similarly, the track metadata file receiver and organiser 188 receives the track metadata packets and arranges them into the correct order. The track metadata is stored in the memory when the data packets have been placed in the correct order. In the embodiment where the track metadata files have FEC applied to them, any missing packets are recreated in the same manner detailed above.

The information service receiver and organiser 190 operates in the same manner and, in addition, determines from the first memory cache which of the broadcast music tracks are available for purchase, i.e. which a data files are stored in the first cache.

The information service receiver and organiser 190 pulls all of the information, including which music tracks can be purchased and the associated track metadata together to compose an information service GUI which is sent to the GUI driver 162 to be output to the user.

If the information service receiver and organiser 190 determines that a data file is not currently stored in the first memory cache 174, and also that the data file is not currently in the process of being received (i.e. the data file delivery stream contains the currently playing music track), the information service receiver and organiser 190 will determine from the information within the information service whether that music track is available to be downloaded to the user's PC 26. If so, the information service GUI displayed to the user will provide a suitable link to allow the user to purchase the music track via their receiving device. This option is primarily useful, where a user has tuned in to the DAB radio station 22 after the broadcast of a music track has commenced and as a result where the user may have missed receiving the corresponding data file 114.

Purchase transactions are now described with reference to FIGS. 5 and 11.

When a user selects to purchase an available music track, the purchase controller 168 composes a purchase request, which is transmitted by the receiving device's telecommunications transmitter 170 to the music library 82. The purchase request is made via the GPRS back channel and comprises data (an encrypted International Mobile Equipment Identity (IMEI) and a Mobile Subscriber Integrated Services Digital Network Number (MSISDN)) which identifies the receiving device 24, i.e. the MSISDN of the receiving device making the request, and a purchase ID for the requested music track.

The purchase ID identifies both the music track (i.e. MLID) and the radio station 22 which the user is currently tuned into. The music library 82 needs to know which radio station 22 prompted the purchase because each radio station 22 is treated as a separate music store.

The music library 82 checks to see if the user has previously purchased the selected track. If the answer is yes, the music library will re-issue the decryption key without the user being charged again, subject to the purchase request from the receiving device being authenticated as described below.

If the answer is no, payment must be received via the third party billing system 86 before the decryption key is transmitted to the receiving device 24.

In either event, the music library 82 passes the purchase request to the third party billing system 86. As stated above, the third party billing system 86 carries out payment transactions in association with the authentication gateway 84, and accordingly forwards the purchase request to the authentication gateway 84.

The authentication gateway 84 can determine the MSISDN of the receiving device 24 making the purchase request and compares the determined MSISDN to the received encrypted MSISDN which is included in the purchase request. For successful authentication the determined and received MSISDNs must match.

Once authentication has been approved, the authentication gateway 84 passes the purchase request back to the third party billing system 86 (shown in FIG. 5), where a purchase transaction, if required, is completed, i.e. if the music library 82 has determined that the receiving device has previously purchased the music track in question, no further payment is required.

The purchase transaction may be carried out by checking the amount of funds available in a pre-paid account of the user or through a debit transaction, where the user's account details are known through a registration procedure. Alternatively, the charges for the music track may be passed directly on to the user's mobile phone account, to be billed periodically (typically monthly).

Upon completion of a successful purchase transaction, the third party billing system 86 indicates to the music library 82 that the licence (including a decryption key and rights object) can be transmitted to the receiving device 24 via the GPRS back-channel. In which case, the music library 82 locates the decryption key associated with the MLID of the selected data file. The music library encrypts the decryption key in such a manner that only the receiving device 24 making the purchase can decrypt the key and the music library 82 subsequently transmits the encrypted decryption key to the receiving device 24, where it is received, and stored in decryption key store 200.

Unsuccessful transactions may be re-attempted. In particular, where a user has insufficient funds in their pre-paid account, the user is given the opportunity to top-up the funds in their account and will subsequently complete their purchase.

It is to be appreciated that registered users may select a preferred method of payment. However, users may be prompted before the purchase request is sent to the music library, which payment method should be used.

In an alternative embodiment, an authentication request may be transmitted to the authentication gateway 84 prior to a purchase request to the music library 82. The authentication request is shown by the dashed line X in FIG. 5. The authentication gateway 84 authenticates the receiving device 24 in the same manner described above, and upon successful authentication, the receiving device 24 then transmits a purchase request to the music library 82 which only deals with the billing transaction and provision of the music track since the authentication step has already been completed.

Figure 13:
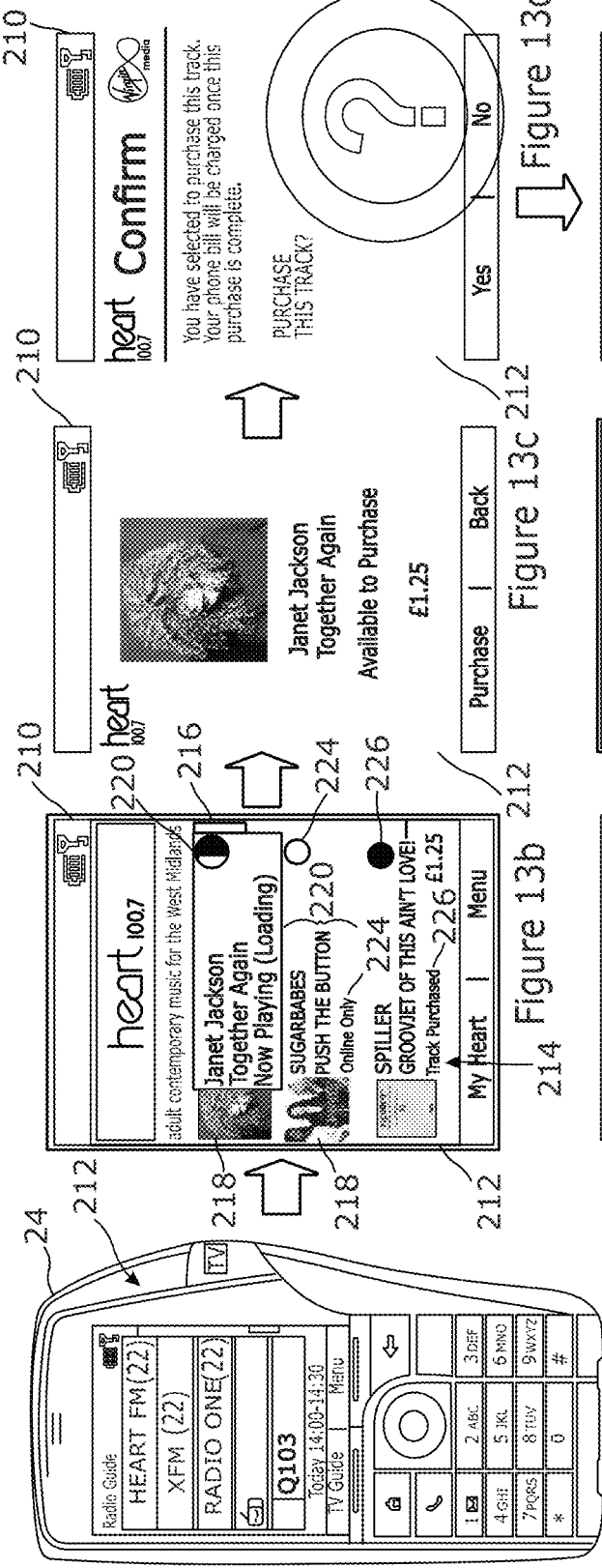
FIGS. 13a to 13g are a series of screenshots of a graphical user interface of the receiving device of FIGS. 2 and 5.

Screenshots 210 of an exemplary embodiment of the present invention are shown in FIG. 13.

As shown in FIG. 13*a*, the receiving device's GUI 212 shows a list of available radio stations 22 which the receiving device 24 can tune into. FIG. 13*b*, shows the information service GUI 212 which displays a list 214 of music tracks which have been broadcast by the radio station Heart FM®. The user scrolls through the list 214 using a scroll bar 216.

In the GUI 212, the user is presented with information about the music tracks which have been broadcast. Track metadata in the form of graphics 218 and textual information 220 is presented to the user together with an indication of what actions may be taken regarding the music tracks.

A first indicator 222 shows music tracks which are available for purchase, a second indicator 224 shows that the music track is not available for instant access at the receiving device 24 but which may still be purchased and collected online via the Internet, and a third indicator 226 shows whether a track has already been purchased. The indicators may be symbols as shown in FIG. 13*b*. The indicators may also be colour coded in order to improve the intelligibility of the information service GUI.

In another embodiment, the indicators are simply textual statements which clearly convey the information regarding the availability of the music tracks for purchase, via which route.

The remaining screenshots 210 13c to 13g show the user experience throughout a purchase transaction. FIG. 13c shows a screenshot relating to a music track which has been selected for purchase. This screenshot provides more information to help a user make a purchasing decision. Using a keypad or input device of the receiving device, the user selecting to purchase this music track is shown a confirmation screen like that of FIG. 13d, where the user must confirm that they wish to proceed with the purchase. Upon a successful transaction, the user is presented with a screenshot like that of FIG. 13e which states that the purchase has been successful and also provides dual download information, in the form of a link to a website, to enable a user to gain access to the purchased track via the Internet. FIG. 13f, again shows the list 214 of music tracks which have been broadcast in the information service GUI. The purchased music track is shown, by the third indicator 226, as having been purchased. A user selecting this item is shown the screenshot of FIG. 13g which confirms that the track has been purchased and is available online via the link shown.

Figure 14:
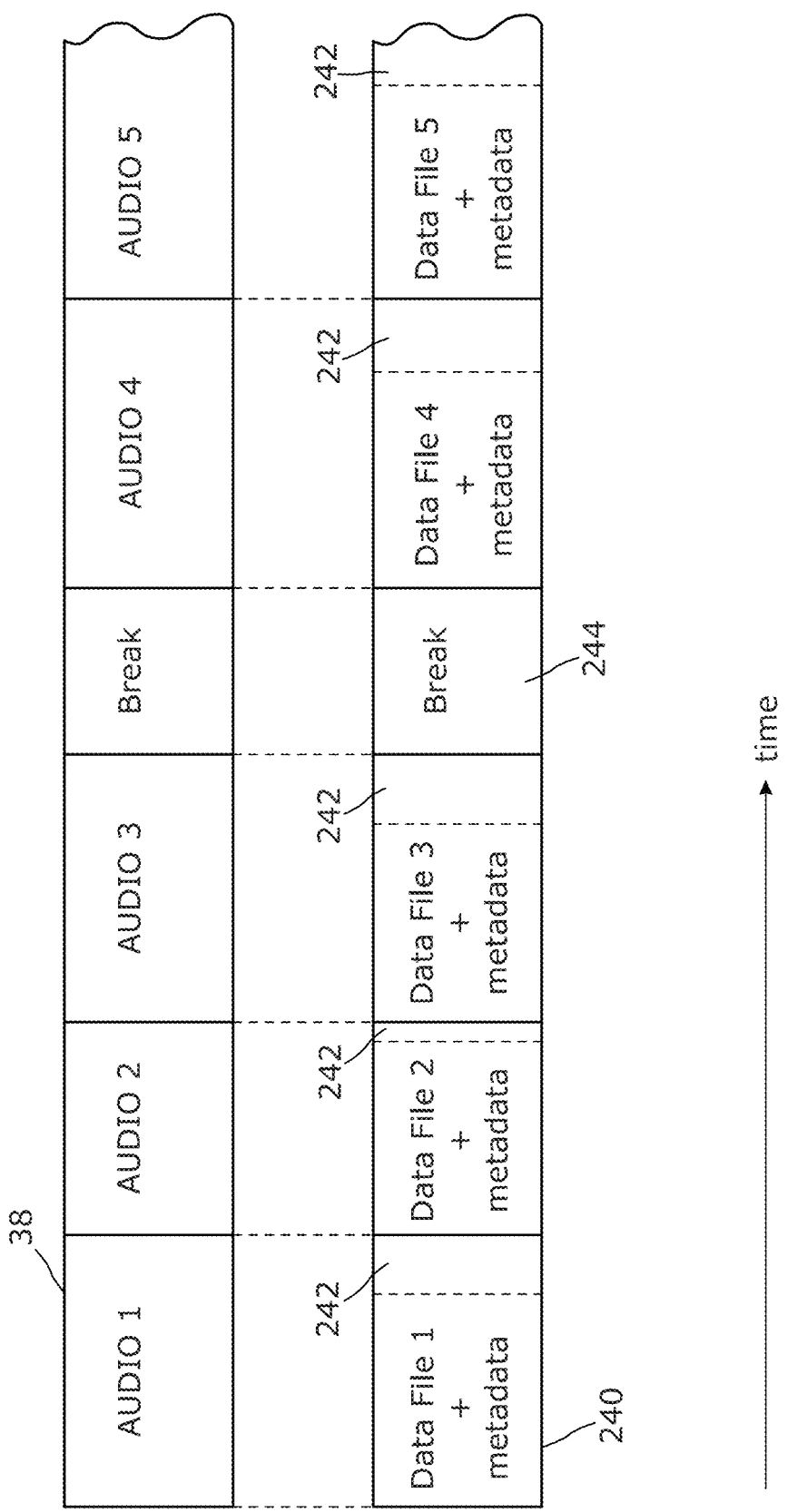
FIG. 14 is a schematic timing diagram showing a dual broadcast stream used in the present embodiment including an audio stream and an associated concurrent encrypted data stream.

FIG. 14 is a schematic diagram of a dual broadcast stream including an audio stream and an associated concurrent interleaved encrypted data file and metadata stream 240.

As shown, the start of data transmission is synchronised with the start of the audio transmission. Typically, the data transmission will be completed before the audio stream/music track finishes. Therefore, there are gaps 242 in the data stream 240 where no content is being broadcast. There are a number of uses for the gaps in the transmission of the DAB music files. In addition to the gaps 242 shown in FIG. 14, there are data channel gaps (breaks) 244 during travel, news, presenter links and promotion broadcasts, which can be used for transmitting data for other purposes. Some of the other purposes include pictures/video, and additional information. For example, an audio/textual copy of the news can be broadcast during the news broadcast, and visual advertisements can be broadcast during the commercial breaks. Also, additional content such as bundle purchases, including but not limited to ring tones, wallpaper, e-tickets, e-vouchers, celebrity voicemail greetings could be broadcast during these gaps. Furthermore, an updating program can be broadcast during these gap periods which can be used by the receiving device to updates its music track purchase application. The updating program can be used to update any aspect of the application, including the GUI, the purchase request communication address, and the tariffs.

The gaps 242, 244 could also be used to "trickle" hidden tracks/content e.g. top 10 summer tunes for today, which would become available to the user at a designated and pre-promoted time. The term trickling reflects the fact that the complete file may be too big to send in one gap 242, 244 and so it may be broken up into a plurality of smaller sub-files which are transmitted in a plurality of gaps. The receiving device 24 then compiles all of the sub-files to make up the desired main file in the background. The file then is present on the receiving device 24 in advance of the broadcast promotion relating to it and is available for 'instantaneous' download (by way of decryption) when selected by the user.

The gaps 242, 244 identified assume the data version of the track will finish before the broadcast version. However, there may be times when the opposite will apply. If this does happen, the next data version of the track will be queued and will start to be transmitted straight after the previous data version of the track has finished. This will result, in some cases, in temporary de-synchronisation but this will not be significant enough to materially affect the service and will be remedied when the audio stream is not broadcasting music, i.e. during commercial breaks and news breaks etc. The data transmission 240 will continue until it has effectively caught up with the audio stream 38 such that, in normal operation, the start of data transmission 240 is re-synchronised with the start of the audio stream 38.

Figure 15A:
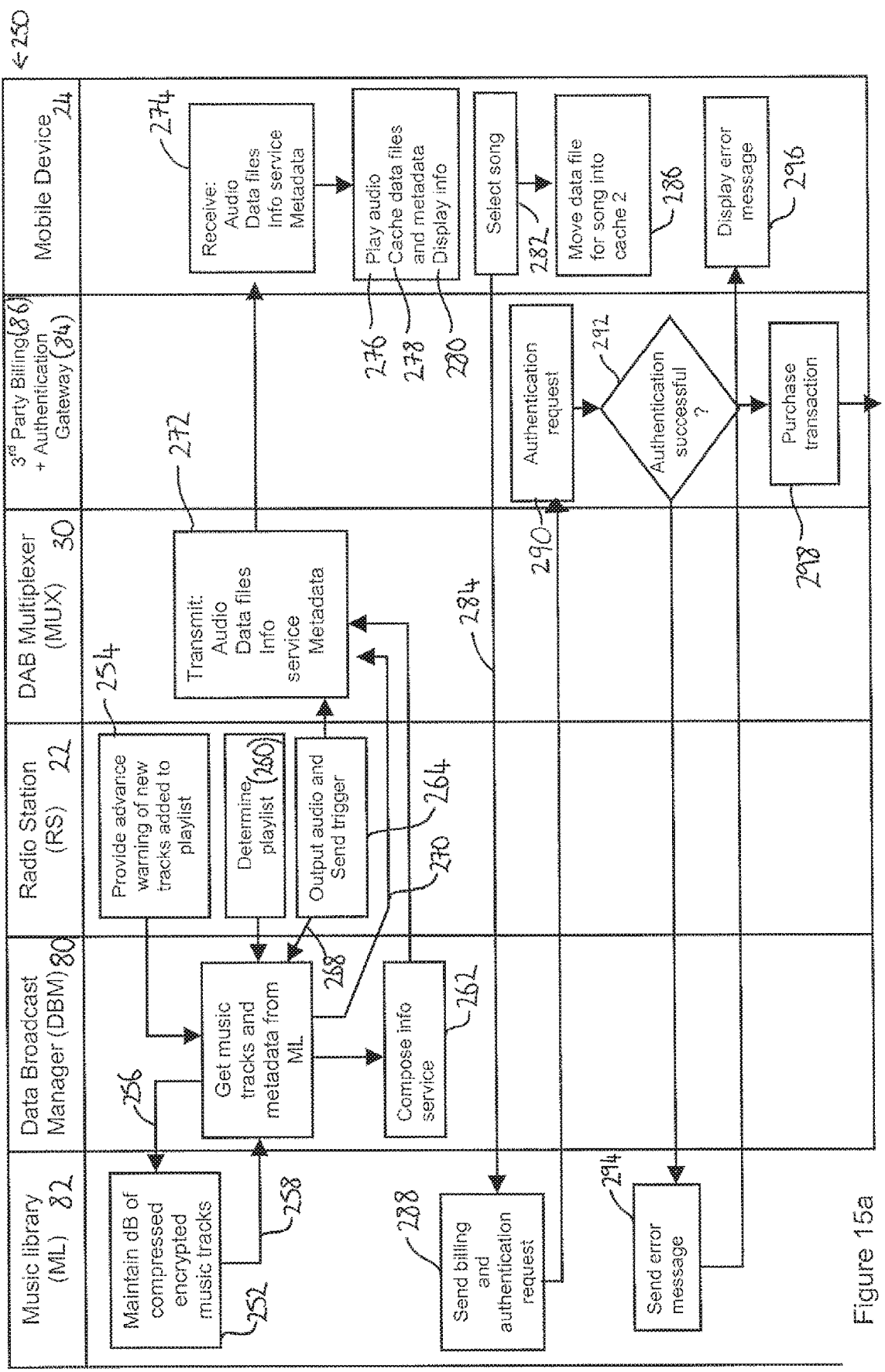
FIGS. 15*a* and 15*b* are a detailed flowchart showing the steps of operation of the present embodiment.
Figure 15B:
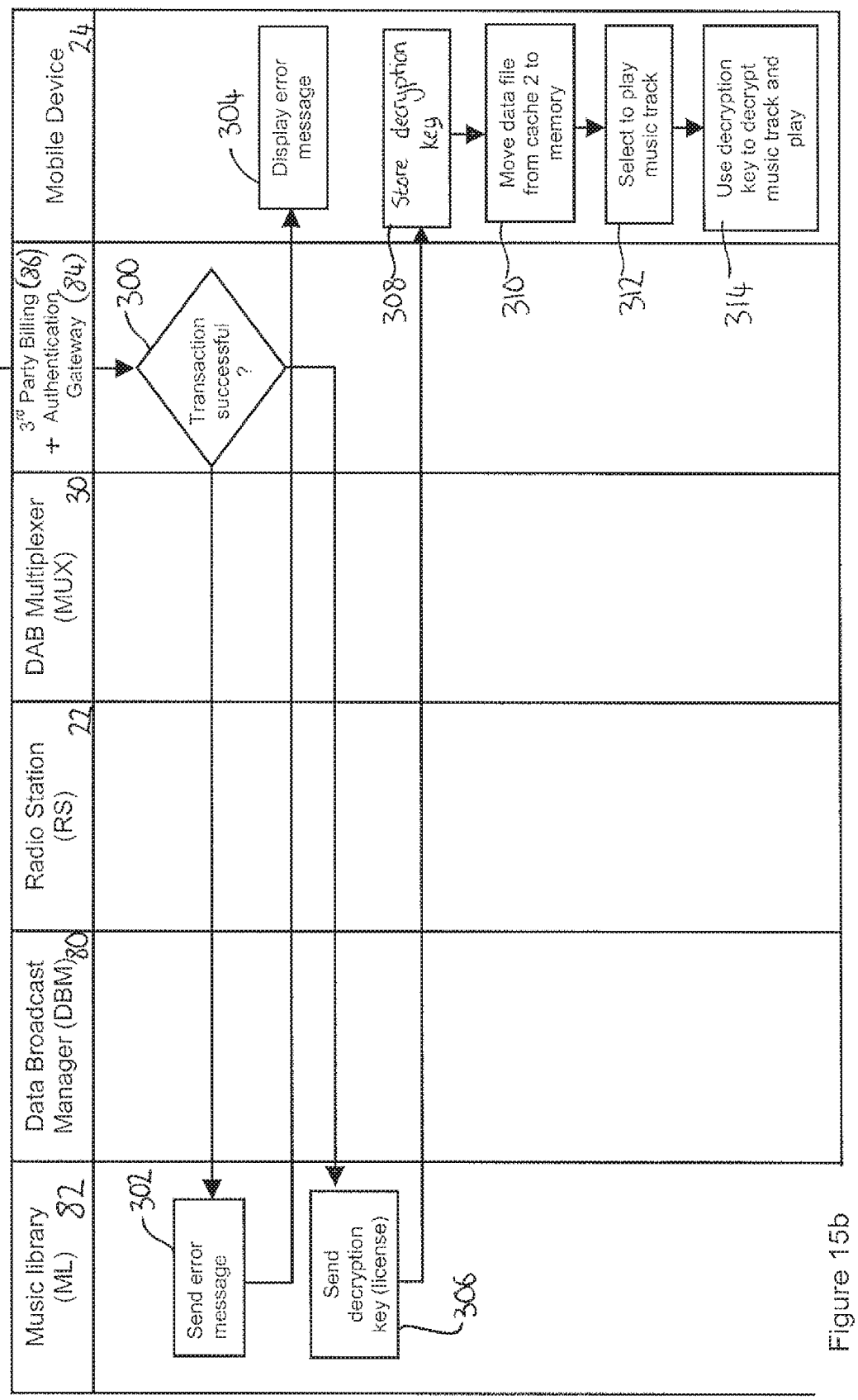

A flowchart 250 showing the steps of operation of the system is shown in FIGS. 15a and 15b.

A database 82 of available compressed encrypted music files is maintained and updated, at step 252, with new music tracks (data files) as they are released. A radio station provides, at step 254, an advance warning notification 120 regarding new music tracks that are being added to the radio station's play-catalogue 116. The data broadcast manager 80 requests, at step 256, music tracks and metadata for each music track identified within the advance warning notification 120, and receives, at step 258, copies of the music tracks and metadata for storing in the DBM content database.

The radio station determines, at a step 260, a playlist of music tracks and their associated timing. The timing of radio station broadcasts is quite precise, though there is some degree of tolerance for margins of timing error. However, there may be a deviation from the playlist i.e. either music tracks are played out of sequence, or music tracks are added or dropped. In either case, the information service is updated with playlist changes. Music tracks will still be available for purchase as, despite being out of order, they are stored in the DBM content database 102 and will be broadcast to the mobile receiver device 24, albeit in a different order.

The broadcast manager 80, upon receipt of the playlist, generates, at step 262, an associated information service message relating to the playlist.

The ratio station 22 outputs, at step 264, an audio file to the DAB multiplexer, and at the same time, posts, at step 268, a trigger signal 92 which is received by the data broadcast manager 80. In response to the trigger signal 92, the data broadcast manager outputs, at step 270, the encrypted data file and metadata corresponding to the audio file.

The audio stream 38, from the radio station 22, and the encrypted data file, metadata and the information service message, from the data broadcast manager, are transmitted, at step 272, by the DAB multiplexer 30 and are received, at step 274, by the DAB receiver 160 provided in the mobile receiver device 24.

The mobile receiver device 24 plays, at step 276, the radio station's audio stream, stores, at step 278, the encrypted music files and metadata in the first memory cache 174 of the mobile receiver device, and displays, at step 280, the information service GUI.

The information service GUI shows the user which music tracks are available for purchase. Typically, the first cache memory 174 stores the music tracks in chronological order and may store a maximum of, for example, five (in this embodiment) music tracks at any time. Thereafter, each additional received music track replaces the oldest music track, i.e. in a first-in-first-out regime. Therefore, the information service GUI shows a list of approximately five music tracks which are the most recently played tracks. The information service GUI may also show a list of upcoming songs which are most likely to be broadcast.

Where the user initiates listening to the radio midway through transmission of a music track, at least in this embodiment of the invention, the information service GUI will indicate that this music track is not available instantaneously but is available for purchase by being downloaded to the user's PC 26. The information service GUI also indicates music tracks which were broadcast prior to the user tuning in, which are available for purchase by being downloaded to the user's PC.

The user selects, at step 282, an available music track from the list and a purchase request is transmitted, at step 284, to the music library which authenticates the mobile receiver device 24 sending the request. In addition, in response to the purchase request, the receiving device moves, at step 286, the data file and corresponding metadata into the second memory cache 176 while the purchase transaction is being carried out. This prevents the data file and metadata being over written during this time, as new data files corresponding to the currently playing song are received.

A billing and authentication request is sent, at step 288, to the third party billing system 86, i.e. the mobile phone operator for example Virgin®.

The third party billing system 86 sends the request to an authentication gateway 84, which processes, at step 290, the authentication request. Whether the authentication request is successful is determined, at step 292. If not successful, an error message is transmitted, at step 294, by the music library 82 to the receiving device 24, and is subsequently displayed, at step 296.

If the authentication request is successful, a purchase transaction is carried out, at step 298. Whether the purchase transaction is successful is determined, at step 300. If not successful, an error message is transmitted, at step 302, by the music library to the receiving device, and is subsequently displayed, at step 304.

If the purchase transaction is successful, the music library 82 transmits, at step 306, a decryption 'key' to the receiving device, which is stored, at step 308, in the decryption key store 200. In addition, the data file stored in the second memory cache 176 is moved, at step 310, to a semi-permanent memory 178 of the receiving device, i.e. an SD memory card.

When a user selects, at step 312, to listen to a purchased music track, the decryption key is used, at step 314, to "unlock" (decrypt) the encrypted music file. Step 314 is repeated each time the music track is selected to be played.

The encrypted music file and the decryption key are stored in a semi-permanent memory location of the data store of the mobile receiver device so that the music track may be replayed at the user's leisure.

The user will receive at the receiver device a confirmation message at the end of a successful transaction containing details regarding how to pick up their dual download on their PC. An unregistered user may receive a unique purchase reference code in the confirmation message to enable the user to download a version of the purchased music track via the web server 88 of FIG. 5. The unique purchase code may also be used by the user during a registration process, at the end of which the user is able to download the purchased music track via the web server.

Alternatively, if the user is registered with the Web site, they will receive an e-mail from the web server 88 of FIG. 5, which provides a link to where they can download the music track.

Figure 16:
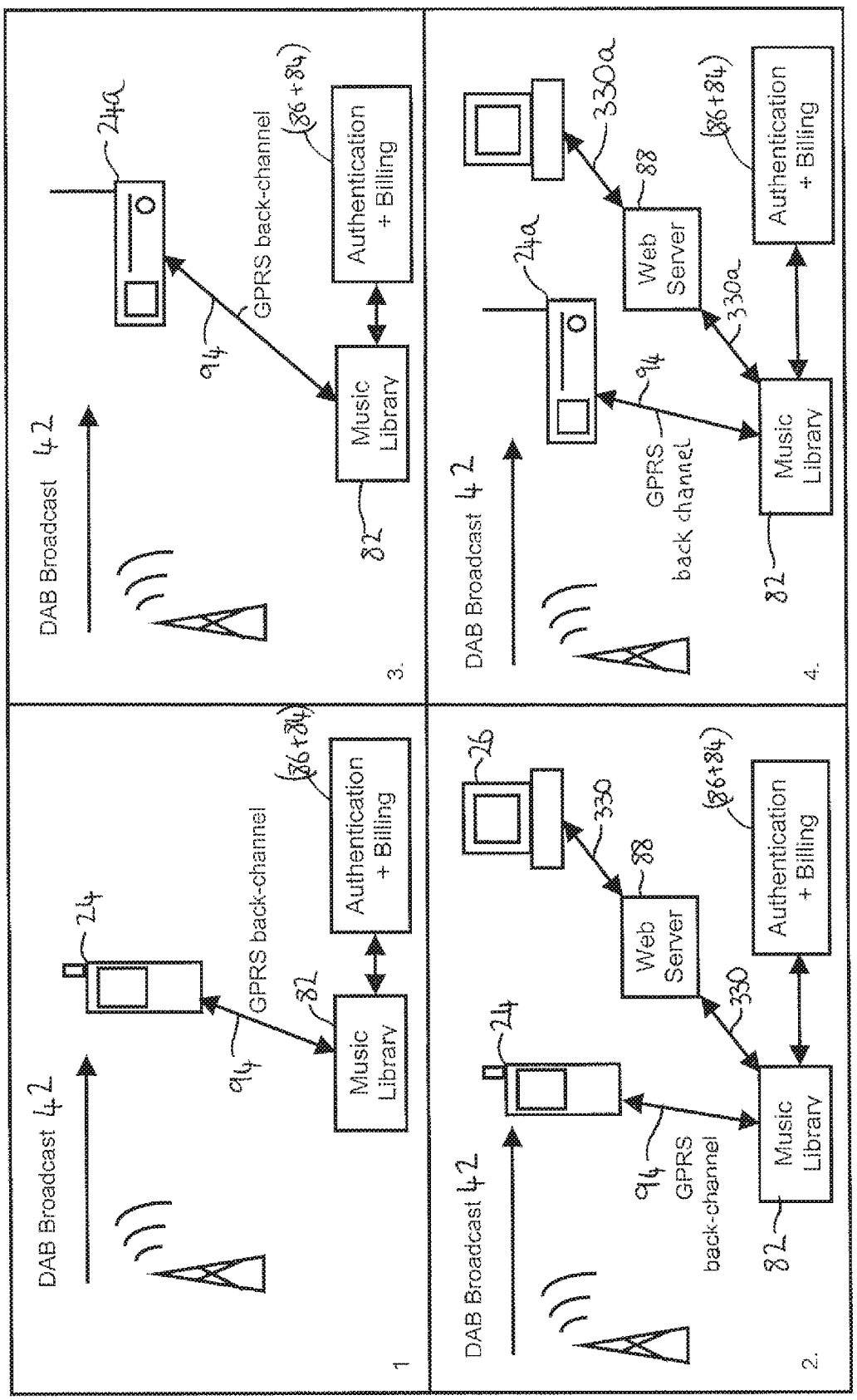
FIG. 16 is a series of schematic overview block diagrams showing four further embodiments of the present invention.
Figure 17:
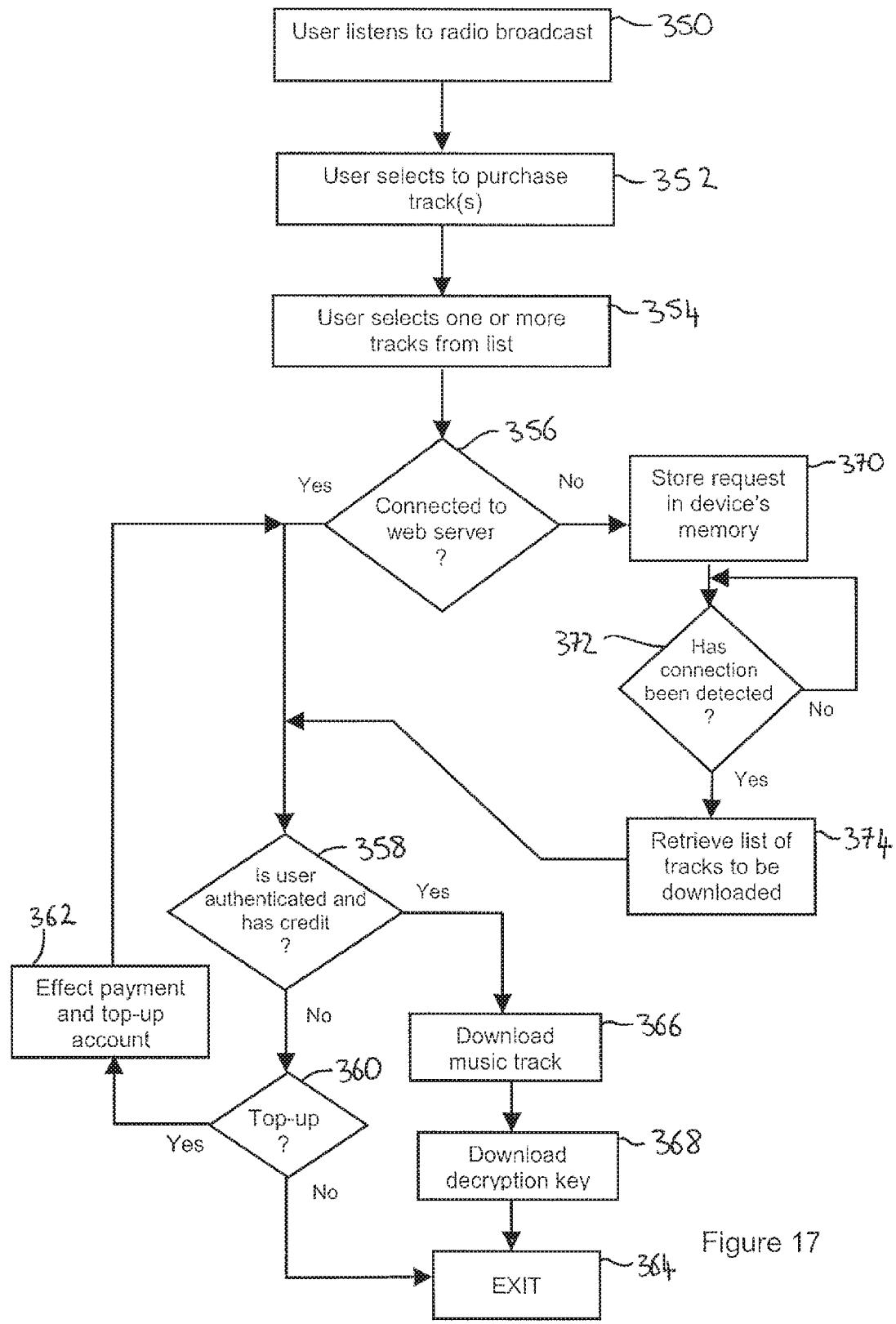
FIG. 17 is a flowchart showing the steps of operation of a further alternative embodiment of the present invention.

FIG. 16 shows four different configurations representing different embodiments of the present invention. Each configuration relates specifically to a different combination of the type of receiver device used and Configurations 1 and 3 relate to the provision of a dual download facility whereas Configurations 2 and 4 relate to a DMD Lite download facility. More specifically, in Configuration 1, the receiver 24 is a mobile phone with a DAB chip within it. The phone utilises its GPRS capability as the back-channel 94 to the music library 82 which in turn connects to the third-party billing 86 and authentication systems 84. Here the music downloads are primarily provided for use on the mobile phone which typically has an mp3 music file player built into it. Although, music downloads purchased in this manner may additionally be downloaded to the user's PC 26 (in a similar manner to that described below).

Configuration 2 is identical to Configuration 1 except for the provision of an additional download channel 330 to a user's PC 26 and for the non-broadcast of the music track to the receiver device. The music library 82 provides the encrypted track and possibly the decryption key to the web server 88 of FIG. 5. The user, having purchased the music track, is then sent a message to download the track from the website for no additional cost. There are numerous ways in which the data can be downloaded. If the user has previously registered with the Web site, the decryption key and the encrypted track are made available for download after the user clicks on a link within an e-mail which is sent to his PC. Alternatively, the user can visit the Web site supported by the web server 88 and confirm the unique purchase reference code received on their receiver device which then allows the music track to be downloaded to their PC 26 at no further cost: downloading the music track also includes downloading the decryption key. The decryption key is again encrypted as it is when transmitted to the receiving device. The request from the PC, for the music track to be downloaded, includes an identifier for the PC making the request. This information is used in the generation of the encrypted decryption key, such that the PC can decrypt the decryption key as required.

In Configuration 3, the receiver is a DAB digital radio device 24a, with a telecommunications chip within it. The radio receives the digital radio broadcasts and utilises its communications chip to establish a communications back-channel to the music library 82 which in turn connects to the third-party billing 86 and authentication systems 84. Here the music downloads are only provided for use on the radio 24a which can play back the stored music tracks which have been purchased. Here the back-channel can either be integrated into the radio device or be provided in a mobile phone which is connected (temporarily) to the radio device 24a. The connection can be via a GPRS connection 94, a wired connection, a wireless connection such as a local WiFi connection or a local Bluetooth connection. As has been mentioned previously the back channels of these receivers can be any two-way communications channel which is available, such as a WiFi channel to the Internet, a fixed line telecommunications channel or GPRS channel. Otherwise Configuration 3 operates in a similar manner to Configuration 1.

Configuration 4 is identical to Configuration 3 except for the provision of an additional download channel 330a to a user's PC 26 and for the non-broadcast of the music track to the digital radio device. The music library provides the encrypted track and possibly the decryption key to a web server. The user having purchased the music track is then sent a message to download the track from the Web site for no additional cost. There are numerous ways in which the data can be downloaded, as have been described above in relation to Configuration 2.

In a further alternative embodiment there is provided the ability for users to download music tracks directly to their PC 26, in response to a purchase request being made from the user's receiving/purchasing device, i.e. mobile phone 24. There are two scenarios, Scenarios 1 and 2, where this embodiment may apply.

In Scenario 1, a user tunes into a radio station 22 and from their GUI they identify that the previous song broadcasted is one they would like to purchase. However, the receiving device was not tuned in at time of broadcast, or at the start of the broadcast, and so has missed the data transmission. However, the present embodiment permits the user to purchase the music track via the GPRS back-channel and to be able to at least download the music track to their PC. In this case the downloading of data is via dual channels (GPRS and the Internet) to the mobile receiver device and to the PC respectively.

In Scenario 2, no data files are ever received by and stored on the mobile phone, for example where the music download system is operating with a radio station 22 which doesn't have enough DAB data capacity. In this embodiment, the user is still informed via their mobile phone 24 of the songs being broadcast and which are available for purchase. However, the download of the data file is made direct to the user's PC 26. In this scenario, the transaction still occurs via the GPRS back-channel 94 but delivery is by another means. In this case the downloading of data is via a single non-broadcast channel to the user's PC 26.

In both Scenarios 1 and 2, after a successful purchase transaction, the decryption key is first transmitted to the user's PC ahead of the data file. The data file is made available for downloaded by providing the user with a link to a web page from where the file can be downloaded. The web page is provided by the web server 88 shown in FIG. 5.

At the user's leisure they can transfer the music track to one or more of their mobile devices 24. One advantage offered by the embodiment identified in Scenarios 1 and 2 is that even if the music track is not available immediately to the receiving device, the user can still carry out the purchase transaction immediately, thereby removing the need for the user to have to search for a desired music track (song) the next time they are logged on to the Internet at their home PC 26. This is advantageous as users may typically forget to take the steps to purchase a music track they desire and so this can lead to a long delay before the music track is obtained, if ever.

As shown in the screen shots in FIG. 13, the GUI makes it clear to the users which tracks are available for immediate delivery and which can be purchased immediately and collected later.

An example of how the present DMD Lite embodiment would work is set out below.

Jo is listening to the radio on her mobile 24 and can see a list of tracks showing what is now playing and what has been previously played. Each track is marked "buy online" and she selects a track that she is interested in. The next screen tells her that she can buy the track for £1.25 and it will be delivered to her home PC. She presses the buy button and confirms that she wants the track to be billed to her mobile phone account.

The display shows the track purchase progressing through a number of stages. After approximately 20 seconds the mobile beeps and displays a message saying that she has successfully purchased the track and showing a web address where she should go to register and pick up the track. If she had already registered then the display would tell her that she has been sent an email reminding her to pick up her track. She returns to the track list and can see that the track is now shown as purchased. She continues listening to the radio.

When she gets home, Jo uses her PC to go to the web address that was displayed. She is invited to register in order to pick up her purchase. She enters her email address and mobile phone number and chooses a password. A text message is sent to her phone and she enters the code in this message into the Web site to complete the registration. She is then taken to a page where her purchased track is displayed. She clicks on the track to download it. She then transfers the track to her phone or MP3 player.

The information service relating to this embodiment is generated in the same manner described above and is delivered via one DAB sub-channel or it may be delivered in the same channel as the audio using an XPAD technique.

In relation to Scenario 2, the information service for a plurality of radio stations may be broadcast via one DAB sub-channel, making effective use of the data capacity available. Each radio stations' information service will have a different multicast IP address and be carried in a separate DAB packet stream.

In a further alternative embodiment herein after referred to as the DMD Lite embodiment, there is provided the ability to download and store music files to a receiving device that is WiFi enabled and which includes a DAB radio chip and mass storage, such as a secure digital (SD) memory card. In this embodiment, there is no requirement for the receiving device to have a GPRS back-channel, for example, this could be any WiFi-enabled digital radio receiver, as found on, but not limited to, mobile telecommunications devices. In particular, the radio receiver may be a household/portable DAB radio which is WiFi enabled for example. This may not even be an integrated WiFi capability but could for example simply be the provision of a data port, such as a USB port, to which a WiFi dongle can be connected to give the DAB radio a separable WiFi capability. Alternatively, the USB port may be used to connect the DAB radio directly to a PC with internet access, rather than using the WiFi dongle.

A WiFi-enabled receiving device is capable of communicating via a wireless local area network (WLAN) to the Internet/servers. Wireless local area networks are localised areas where connectivity to the Internet/servers is possible. The WLANs may be distinct areas, or may overlap. In addition, the WLANs may be configured securely such that WiFi-enabled receiving devices may only connect via the WLAN when they have the necessary security permissions. Alternatively, the WLANs may be unsecured or special reserved ports may allow user access without charge to specific web sites, in which case any WiFi-enabled receiving device may connect to the Internet. The DAB receiver 160 will automatically be able to connect to an unsecured WLAN. However, the DAB receiver 160 must have the necessary access permissions to connect to a secured WLAN.

Of course, many digital radio receivers are easily transportable either being carried on a person or in a car. As such, they can travel between a plurality of WLANs, which provide connectivity to the Internet. As such, there is also no requirement for the purchase transaction to occur immediately. Rather, a user may indicate their desire to purchase a track when the DAB receiver is not within range of a WLAN, and the fulfilment of that purchase may occur the next time the DAB receiver is operatively connected to a WLAN.

A WiFi-enabled device may automatically recognise when it is within range of a WLAN transmitter and automatically connect to the Internet, provided that the WiFi enabled receiving device has the necessary permissions, or that no permissions are required.

FIG. 18 shows the method steps of operation of the present embodiment of the invention.

A user listens, at step 350, to the radio broadcast using the digital radio receiving device, and is presented with an option to purchase tracks through a graphical user interface (GUI). The user selects, at step 352, to purchase tracks and is presented with a plurality of tracks which they can purchase. This may include the currently playing music track and a plurality of previously played tracks or upcoming tracks. Alternatively, the currently playing music track and a random selection of other music tracks may be listed as being available for purchase.

The user selects, at step 354, to purchase one or more tracks from the list, and the receiving device performs, at step 356, a test to determine whether a connection to the Internet is available. In particular, the receiving device tests whether a connection between a music library server 82 and the receiving device 24 is present. The test may comprise a PING request to the IP address of the music library server via the WLAN. In another embodiment, the DAB receiver proceeds to attempt to communicate with the music library in order to test the connection.

If there is a connection, the receiving device determines, at step 358, whether the user/receiving device is authorised to purchase music tracks or whether the user has sufficient credit in his account to pay for the music track. The authorisation/payment step is similar to the above-described embodiment. If the receiving device determines, at step 360, that the user is not authorised or does not have sufficient credit, the user is presented with the option of topping up their credit balance of their pre-pay account and if this option is selected the top-up is effected, at step 362, and the user is allowed to try the transaction again. Otherwise, the GUI will display a message conveying this to the user and will exit, at step 364, the application.

If the user is authenticated, at step 358, an encrypted data file for the selected music track(s) is transmitted, at step 366, over the WLAN to the receiving device. The encrypted data file is stored on local data store, such as an SD memory card.

A decryption key for decrypting the stored encrypted data file is transmitted, at step 368, over the WLAN to the receiving device, where it is stored in the local data store.

As a result, the music track is available for the user to play at any time. When the user selects to listen to a stored music track through a media application, the application will retrieve the decryption key and will decrypt the stored encrypted data file each time the music track is played. This prevents unencrypted versions of the music track being shared without the necessary permission licences being in place.

If the receiving device determines, at step 4, that there is no connection to the server, the request to purchase music track(s) is stored, at step 370, in the receiving device's memory for later transmission.

Later the receiving device determines, at step 372, whether a connection to the server has been detected. This may be in response to a flag being set when connection is made, or the receiving device may test the connection at predetermined intervals. If there is a connection between the receiving device and the server, the list of music tracks which the user wishes to purchase is retrieved, at step 374, from memory such that the receiving device can make a request, beginning at step 358, to the server to initiate transmission of each of the music tracks to be purchased.

In a further alternative embodiment, the delivery is similar to the DMD Lite embodiment detailed above. Instead of a music track being transmitted directly to the receiving device 24, the transaction takes place over the WLAN, but delivery of the music track is made to a user's PC 26, i.e. an encrypted version of the music track is made available for download and a link to the available track is provided to the user.

The link may be sent to the user through an e-mail or the user may login to a web application and be provided with the link. Alternatively, download of the music track may begin automatically when the user logs in to the web application. The link is only made available to the user when the user has been authenticated or has sufficient funds available to complete the transaction. A decryption key is transmitted to the PC 26 when the purchase is authorised. The decryption key operates as described above.

It is to be appreciated that, the three elements of a DAB receiver 160, mass storage 172, and communications back-channel 94 may be provided using three separate elements. For example, a portable DAB receiver device (perhaps of limited capabilities or with limited storage), and iPod or similar device providing mass storage, and a PC 26 or similar device providing a communications back channel. The ability of these three elements to connect with each other provides, to a user, components which will operate with the music download system to facilitate the purchase and download of desired music tracks.

As such, a user listening to a portable DAB receiver, which receives the information service, can select one or more tracks to purchase. Subsequently, the DAB receiver is docked with the PC, which connected to the internet, can automatically access the web server and download the desired tracks. These tracks can then be routed to the iPod's mass storage and are available for the user to transport and listen to as desired.

The purchase of the selected music track is initiated at the time of the user selection, and, in a similar manner to the WiFi embodiment described above, the DAB receiver device can store a list of music tracks selected for purchase. The purchase transaction being completed when the DAB receiver device docks with the PC, which connects to the music library which processes the purchase transactions as described above.

In yet another alternative embodiment, an audio stream is broadcast via the DAB multiplexer or any other audio transmission for example FM or AM radio or via digital TV channels. In this sense it does not matter whether a user is listening to the radio broadcast on their mobile phone with a DAB chip, DAB radio, FM/AM radio or digital TV.

Delivery of the music track and some track metadata may be available through a WiFi connection of the listening device, GPRS connection of the receiving device (the device receiving the radio broadcast), or by facilitating the download of the music track to the user's PC by providing a link to the web site in an e-mail notification.

In order to facilitate the purchase, and therefore delivery, of the music track, the music download system provides an information service, like that described above which lists which tracks are available for purchase. However, the information service is delivered via a different delivery route rather than as part of the DAB broadcast from the DAB multiplexer. In other words, the data broadcast manager composes the information service in the same manner, however, the information service (including at least some track metadata) is not delivered by the output module to the DAB multiplexer, it is delivered to another delivery gateway. Alternative delivery routes include but are not limited to: the WiFi connection of the receiving device; a wireless application protocol (WAP) browser on a GPRS enabled devices such as a mobile phone or PDA. In these cases the web server of FIG. 5 provides a suitable web page which details the list of tracks which are available for purchase.

In another alternative embodiment, the receiving device receiving the radio broadcast is different from a service providing (SP) device which receives and displays the information service. For example, a user listening to the radio on their FM/AM or DAB radio or television uses their WAP enabled mobile phone or PDA to view the information service, and complete the purchase transaction. As described above delivery of the music track and track metadata is achieved by downloading to the user's PC.

In a further alternative embodiment, the user listens to the radiobroadcast via the internet rather than via the DAB multiplex. In this embodiment, the user can view a tracklist of songs previously played, currently being played and the most likely upcoming music tracks via an Internet browser displaying a web page provided by the web server of the music download service. Purchase transactions occur, in this environment using standard Internet payment options.

It is to be appreciated that in yet a further alternative embodiment, the user may select to have the music track and track metadata downloaded to the receiving device or SP device via a GPRS or 3G connection as well as to the user's PC.

As described above, there is a disadvantage in downloading music in this manner in that the connection may break and the download may be unsuccessful, in which case the user can still get the download via their PC. However, this embodiment advantageously still enables the user to gain access to the music track in near real-time when the connection is reliable. Furthermore, a primary advantage of this embodiment is that of providing an easy and quick to use information service that informs users of what music tracks they can purchase and efficiently effecting payment. It is an advantage for at least some users that the selection and purchasing transaction are enabled in response to listening to the radio, regardless of when the delivery of the track occurs.

It is to be appreciated that the uploading of new music tracks to the DBM content database may be achieved in a number of ways. For example, in one alternative embodiment, the content uploader carries out searches through the music library periodically in order to identify whether there are any tracks which are not yet stored within the DBM content database. If there are any such music tracks, they are uploaded and stored in the data file catalogue corresponding to the radio stations which are permitted to sell the identified music tracks.

In another embodiment, new music tracks may be sourced and returned from the music library 82 in response to the trigger signal 92 if it is determined that the trigger signal 92 relates to a track, which has commenced playing, which is not already stored in the DBM content database 102. A second dashed line B in FIG. 6 shows that the content uploader receives the decoded version of the trigger signal 122 which is used to locate and upload the music tracks and meta data. A third dashed line C in FIG. 6 shows that the content uploader is able, in this embodiment, to pass the uploaded music track and track meta data directly to the output module 110 and information service composer 108 rather than requiring the content retriever to retrieve this content.

However, in yet another embodiment only one version of each music track may be stored within the DBM content database 102, irrespective of radio station. In this embodiment a catalogue table is used to determine which radio station has permission to sell each music track.

Some radio stations cannot provide reliable playlists, i.e. if the radio station is broadcasting songs in response to audience requests. As a result, in another embodiment, the content retriever and information service composer may operate on the basis of the trigger signal alone 92.

A person skilled in the art will appreciate that FEC does not need to be applied at the time when the music tracks are uploaded and stored within the DBM content database 102. In another embodiment, FEC is applied to the data file stream 152 prior to transmission. In addition, FEC may also be applied to the track metadata stream 150 or information service stream 154 in the same manner.

It is also to be appreciated that the content retriever 106 of FIG. 10 need not identify music tracks and meta data on the basis of track titles and artist names. In one embodiment, the data broadcast manager further comprises an ID mappings table (shown in FIG. 7) which relates radio station identifiers (RUIDs) to music library identifiers (MLIDs). Some radio stations may use RUIDs within their advance warning notifications, playlists, or trigger signals.

As described above, the music tracks and metadata uploaded from the music library are stored within the DBM content database 102 in relation to the MLID. This is used within purchase requests in order to identify the music track that a user wishes to purchase.

When an RUID is received from a radio station in an advance warning notification 120, the music track is uploaded from the music library 82 on the basis of the track title and artist name information. As in the embodiment described above, the music track is again stored in the DBM content database in relation to the MLID, and in the present embodiment, a record is made in the ID mappings table showing the correlation between the MLID and the RUID. As a result, when RUIDs are used in playlists and trigger signals, the data broadcast manager can use look-up the RUID within the ID mappings table in order to identify the MLID.

This provides another mechanism by which the content retriever can retrieve the music tracks and metadata from the DBM content database. This also provides another mechanism by which the searching module of FIG. 8*b* can identify whether music tracks listed in a playlist are stored within the DBM content database.

In the above embodiments, the music download system relies on being informed of artist names and track titles by the radio station. However, the present invention need not be limited by this. Within the music industry record companies allocate music recordings International Standard Recording Codes (ISRC), which are internationally recognisable codes relating to music tracks, similar to the International Standard Book Number (ISBN) used to identify books.

An ISRC is a twelve character code which follows the following layout:

| | | |
|---|---|---|
| Country Code: | Country of registrant as two character ISO* 3166 code | e.g. FR [i.e. France] |
| Registrant Code: | Three character code assigned by a national ISRC Agency | e.g. Z03 |

-continued

| Year of Reference: | Two digit year of allocation of ISRC | e.g. 97 [i.e. 1997] |
|---|---|---|
| Designation Code: | Five digit serial number of recording | e.g. 00212 |

*International Organisation for Standardisation

Any recording (music track) appearing on multiple albums should have the same ISRC each time.

ISRCs in relation to the previously described embodiments offer a number of variations and alternatives. For example, ISRCs may be used in advance warning notifications 120, playlists 90 and/or trigger signals 92. The data broadcast manager may use ISRCs when uploading content from the music library and/or when finding music tracks and meta data from within the DBM content database. Furthermore, ISRCs may be used in the purchase requests from a receiving device to the music library in order to identify the track which the user wishes to purchase. This offers the advantage that locating files either within the music library or DBM content database 102 is faster and easier.

In addition, ISRCs may be used within the information service, and since ISRCs are only 12 characters long, the number of bits required to transmit the information service is reduced. For example, DAB can carry ISRCs in Fixed PAD codes with 1 bit per DAB frame. The total number of bits sent for one ISRC code equals: a 9 bit sync word, a 3 bit identifier, and a 58 bit code. The total number of bits equalling 70. FPAD is also used to carry other information leaving spare data capacity for transmitting the ISRC. If the spare data capacity were 10 bits/second it will take 7 seconds to send an entire code.

The sending of ISRC codes over DAB is already supported by the DAB standard. However, to alleviate any concerns regarding the use of the broadcast stream containing the ISRCs, the information service, in the present embodiment at least, is encrypted.

An ISRC code will, of course, mean nothing to a user. Therefore, it either needs to be looked up in a database to find the artist and track name, or the artist and track name must be sent in parallel.

Purchase transactions are carried out using a communications back-channel 94 of the receiving device. Where the communications back-channel 94 utilises a mobile telecommunications channel such as GPRS or 3G channel, it is to be appreciated that the purchase request is communicated using mobile telecommunications channel over a mobile telecommunications network to a mobile network/Internet Gateway and subsequently via the Internet to the appropriate server, i.e. the music library 82 or authentication gateway 84.

Having described several particular preferred embodiments of the present invention, it is to be appreciated that the embodiments in question are exemplary only and that variations and modifications, such as will occur to those possessed of the appropriate knowledge and skills, may be made without departure from the spirit and scope of the invention as set forth in the appended claims. For example, rather than using the present invention in a digital radio broadcasting environment, the present invention could be used in the viewing of and playback of broadcast video clips, even on a mobile telephone device. The clips may themselves be purchased using the present file purchase mechanism and stored on the receiver for playback. However, when downloading to a PC is involved, then the purchase can be of the larger video file relating to the viewed video clip, for example a documentary programme or film which has been promoted by a video trailer (video clip).

In addition, the method of downloading music tracks to a receiving device may be implemented through a software program which is loaded on to the receiving device. The receiving device being the device which is able to receive the information service and which facilitates user selection of a music track for purchase.

Whilst the request constructed by the receiving device has been described as identifying the desired data file, it may also comprise an authentication code. In such a case the authentication code may contain a unique identifier of the device. In practice two unique identifiers can be used. The first one identifies the device (or at least the phone number of the device in a mobile application) and is used for authorisation. However, in order to encrypt the decryption key, the server needs additional information from the device which assists in making the identifier more unique to the application on the device which is to interact with the received data file.

In one embodiment, this is information relates to the Windows Media Player installation on the device. Typically the information is quite a long string of characters typically a few thousand 1000 characters long.

Specific combinations of elements have been described in the various embodiments. However, it is to be appreciated that the described elements can be combined in different ways to achieve systems which can implement the invention as described in the accompanying claims. Furthermore it will be obvious to a person skilled in the art that, as the technology advances, the inventive concepts described herein can be implemented in various ways. The invention and its embodiments are not limited to the examples described above but may vary within the spirit and scope of the accompany claims.

What is claimed is:

1. A digital broadcast system for broadcasting audio or video content over a digital broadcasting channel, the digital broadcast system comprising: a data broadcast manager and a digital broadcast output, wherein the data broadcast manager comprises a processor having a memory and programmed to implement:

a content retriever module, wherein the content retriever module is adapted to receive at a time of broadcast a trigger signal from a broadcast source comprising an audio or video content identifier identifying a current segment of audio or video content for broadcast over the digital broadcasting channel; and wherein the content retriever module identifies and selects a data file, said data file comprising an audio or video file containing the audio or video content corresponding to said audio or video content of the current segment identified by the audio or video content identifier; and an output module adapted to output data for broadcasting over the digital broadcasting channel, wherein the output module obtains the data file relating to the current segment and outputs the data file and the current segment to the digital broadcast output as data streams for synchronous broadcast from said digital broadcast output; wherein the output module further controls a timing of the output of the data file from the digital broadcast output; and wherein the digital broadcast output is adapted to receive the current segment of the audio or video content from the broadcast source and comprises a digital broadcast multiplexer which multiplexes said data streams to broadcast the current segment of audio or video content and the data file in a broadcast signal over the digital broadcasting channel.

2. A digital broadcast system according to claim 1, wherein the content retriever module receives a schedule of segments of audio or video content for future broadcast by a broadcast source, wherein the content retriever module locates related data files for the segments of audio or video content.

3. A digital broadcast system according to claim 1, wherein the data broadcast manager further comprises an information service composer, wherein the information service composer composes an additional information signal for broadcast with the data file relating to the current segment, the additional information signal comprising information relating to segments of audio or video for broadcast, wherein the information service composer provides the additional information signal to the output module, and the output module provides the additional information signal to the digital broadcast output; and wherein the digital broadcast output broadcasts the additional information signal with the current segment of audio or visual content and the data file in the broadcast signal over the digital broadcasting channel.

4. A digital broadcast system according to claim 1, wherein the trigger signal comprises an HTTP post signal.

5. A digital broadcast system according to claim 1, wherein the output module outputs the data file as an encrypted data file.

6. A digital broadcast system according to claim 1, wherein digital broadcast multiplexer combines the audio and video content and the data file into the broadcast signal, wherein the digital broadcast output broadcasts the broadcast signal on the digital broadcasting channel.

7. A digital broadcast system according to claim 3, wherein the digital broadcast multiplexer combines the audio or video content, the data file, and the additional information signal into the broadcast signal, wherein the digital broadcast output broadcasts the broadcast signal on the digital broadcasting channel.

8. A digital broadcast system according claim 1, wherein the digital broadcast system is a digital radio system and the digital broadcast output is adapted to broadcast the broadcast signal over the digital broadcasting channel, which is a digital radio channel.

* * * * *